(12) United States Patent
Higuchi

(10) Patent No.: US 8,443,217 B2
(45) Date of Patent: May 14, 2013

(54) INFORMATION PROCESSING APPARATUS, METHOD, AND PROGRAM

(75) Inventor: Satoshi Higuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 593 days.

(21) Appl. No.: 12/621,692

(22) Filed: Nov. 19, 2009

(65) Prior Publication Data

US 2010/0131782 A1 May 27, 2010

(30) Foreign Application Priority Data

Nov. 25, 2008 (JP) ................................ 2008-299539

(51) Int. Cl.
*G06F 1/00* (2006.01)
(52) U.S. Cl.
USPC ........... 713/310; 713/300; 713/320; 713/321; 713/324; 700/94; 381/120
(58) Field of Classification Search .................. 713/300, 713/310, 320, 321, 324; 700/94; 381/120
See application file for complete search history.

(56) References Cited

U.S. PATENT DOCUMENTS

| | | | | | |
|---|---|---|---|---|---|
| 5,752,049 | A | * | 5/1998 | Lee | 713/323 |
| 5,784,628 | A | * | 7/1998 | Reneris | 713/300 |
| 6,690,431 | B1 | * | 2/2004 | Yang et al. | 348/706 |
| 7,363,521 | B1 | * | 4/2008 | Mehan | 713/300 |
| 7,720,238 | B2 | * | 5/2010 | Tomita | 381/107 |
| 8,024,055 | B1 | * | 9/2011 | Holmgren et al. | 700/94 |
| 8,130,982 | B2 | * | 3/2012 | Kano et al. | 381/120 |
| 2002/0010854 | A1 | * | 1/2002 | Ogura et al. | 713/100 |
| 2003/0140262 | A1 | * | 7/2003 | Cromer et al. | 713/310 |
| 2005/0044431 | A1 | * | 2/2005 | Lang et al. | 713/300 |
| 2007/0057931 | A1 | | 3/2007 | Takmori | |
| 2007/0214444 | A1 | * | 9/2007 | Nakai et al. | 716/9 |
| 2008/0010471 | A1 | * | 1/2008 | Aksamit et al. | 713/300 |
| 2008/0079589 | A1 | * | 4/2008 | Blackadar | 340/573.1 |
| 2008/0232209 | A1 | * | 9/2008 | Vergoossen et al. | 369/47.5 |

(Continued)

FOREIGN PATENT DOCUMENTS

| | | |
|---|---|---|
| JP | 2000-056868 A | 2/2000 |
| JP | 2007-208374 A | 8/2007 |

(Continued)

OTHER PUBLICATIONS

HDMI 1.3 Specification; Jun. 22, 2006; pp. 27, 28, 29, 34, 37, 48 and 60.*

(Continued)

*Primary Examiner* — Jaweed A Abbaszadeh
(74) *Attorney, Agent, or Firm* — Wolf, Greenfield & Sacks, P.C.

(57) ABSTRACT

An information processing apparatus including a baseband signal manager, a determining unit, and a power supply controller is connected to one or more apparatus via an interface. The interface includes a signal channel for transmitting baseband signals and a control channel for bidirectionally transmitting control signals. The baseband signal manager transmits a baseband signal sent from a first apparatus to a second apparatus as-is when the information processing apparatus is in a standby power state. The determining unit determines the power state of the second apparatus on the basis of a control signal sent from the second apparatus. When it is determined by the determining unit that the second apparatus is not powered on, the power supply controller suspends power supply to the baseband signal manager.

12 Claims, 13 Drawing Sheets

U.S. PATENT DOCUMENTS

| | | | |
|---|---|---|---|
| 2008/0270635 A1 | 10/2008 | Nakahama | |
| 2008/0294917 A1* | 11/2008 | Khan et al. | 713/310 |
| 2008/0294919 A1* | 11/2008 | Lida et al. | 713/320 |
| 2008/0309830 A1* | 12/2008 | Motomura | 348/738 |
| 2009/0046210 A1* | 2/2009 | Sakamoto et al. | 348/738 |
| 2009/0141170 A1* | 6/2009 | Asayama et al. | 348/552 |
| 2009/0262015 A1* | 10/2009 | Kim et al. | 342/357.09 |
| 2009/0290065 A1* | 11/2009 | Asayama et al. | 348/553 |
| 2010/0070783 A1* | 3/2010 | Okamoto et al. | 713/310 |
| 2010/0131782 A1* | 5/2010 | Higuchi | 713/310 |
| 2011/0291817 A1* | 12/2011 | Maegaki et al. | 340/12.22 |

FOREIGN PATENT DOCUMENTS

| | | |
|---|---|---|
| JP | 2007-267080 A | 10/2007 |
| JP | 2007-274065 A | 10/2007 |
| JP | 2007-274296 A | 10/2007 |
| JP | 2007-288247 A | 11/2007 |
| JP | 2008-034907 | 2/2008 |
| JP | 2008-079128 A | 4/2008 |
| JP | 2008-182525 A | 8/2008 |
| JP | 2008-283469 A | 11/2008 |
| WO | WO 2007/040080 A1 | 4/2007 |
| WO | WO 2007052625 A1 * | 5/2007 |
| WO | WO 2007072791 A1 * | 6/2007 |
| WO | WO 2008-108070 A1 | 9/2008 |

OTHER PUBLICATIONS

Onkyo TX-SR606 Instruction Manual; 2008.*

The Onkyo 606 Owners Thread | AVForums.com—UK Online—May 1, 2008.*

"High Definition Multimedia Interface Specification"; Draft FC11, Oct. 30, 2006, Version 1.3a.

* cited by examiner

FIG. 6

| SYSTEM POWER | CONTROL FOR HDMI | POWER LED | POWER TO HDMI BLOCK |
|---|---|---|---|
| POWER ON | (DON'T CARE) | ON (GREEN) | Y |
| OFF | OFF | OFF | N |
| ACTIVE STANDBY | ON | ON (YELLOW) | Y |
| | | | N |

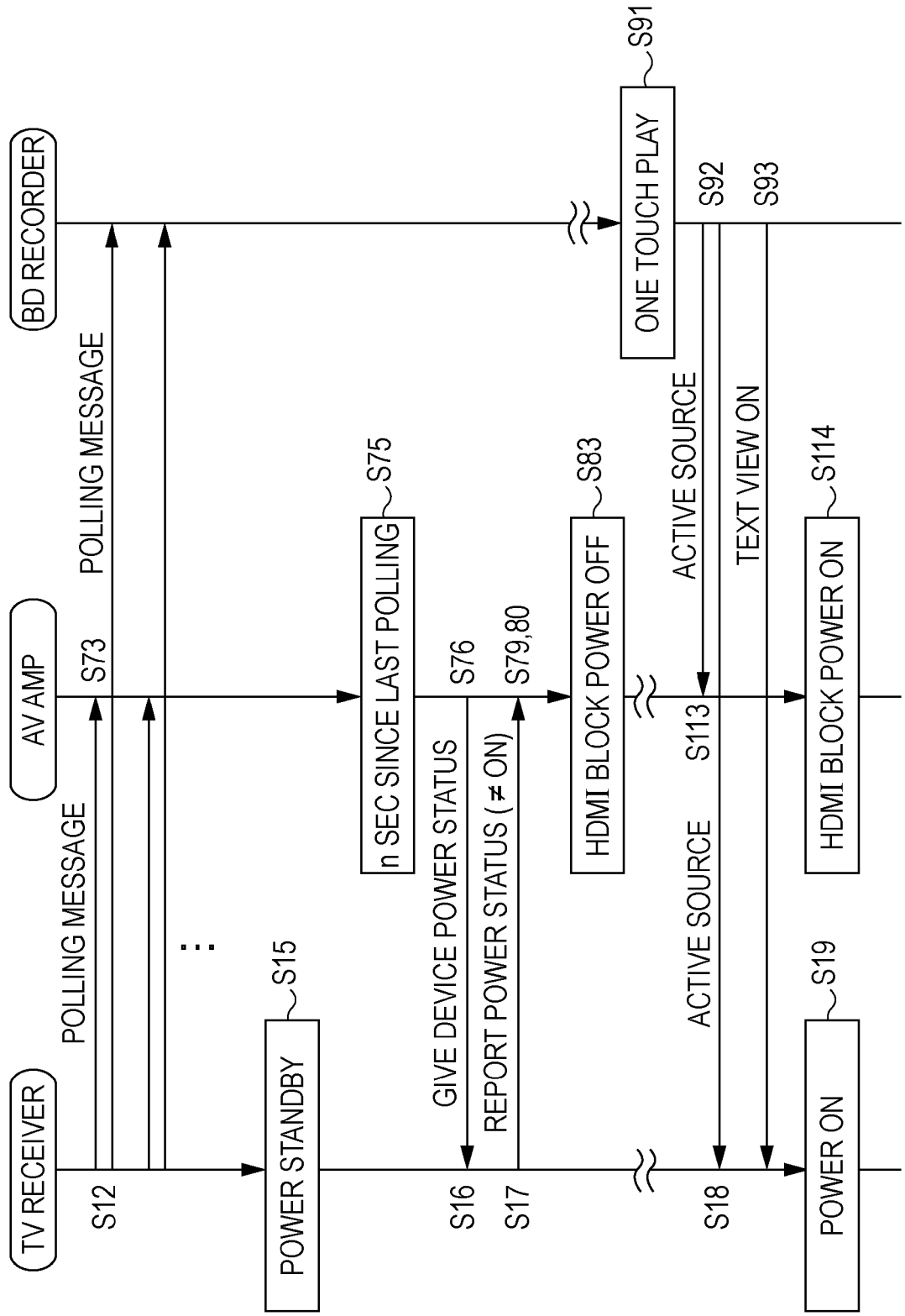

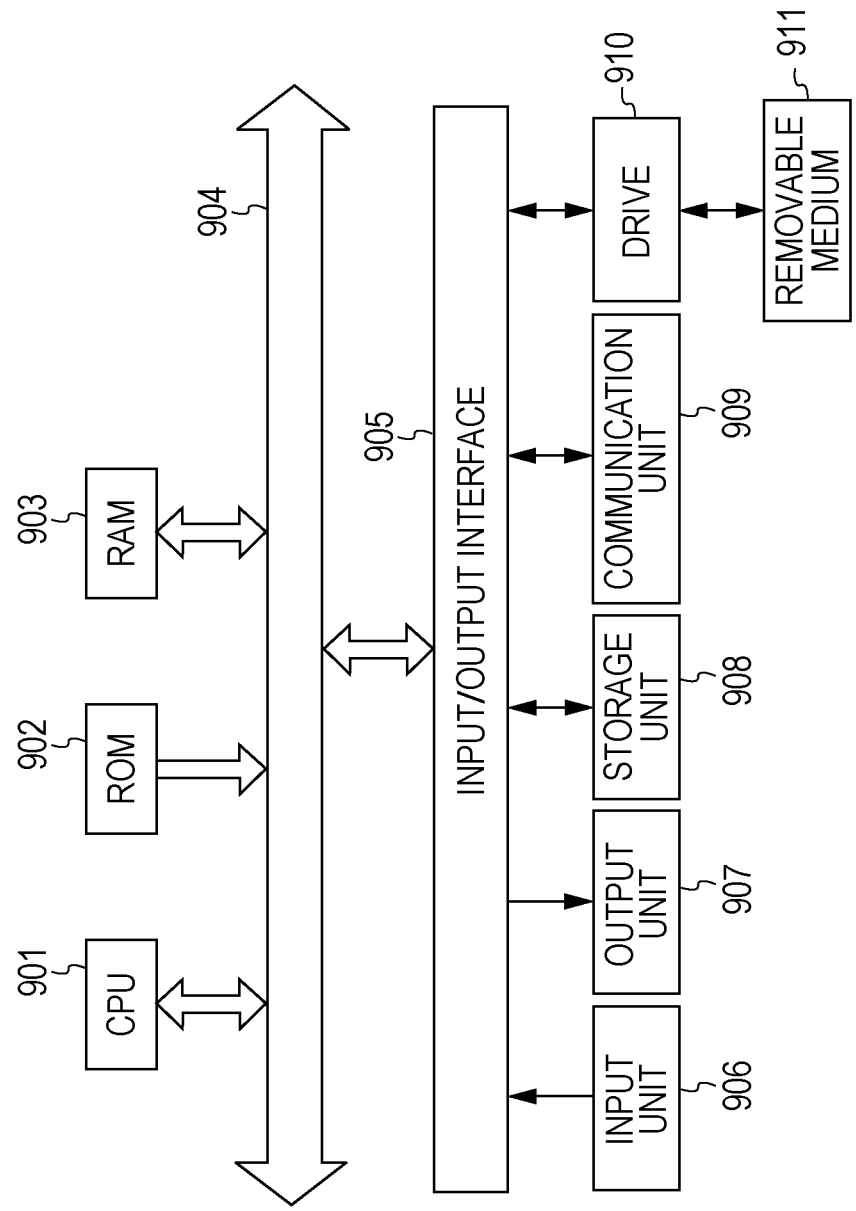

INFORMATION PROCESSING APPARATUS, METHOD, AND PROGRAM

BACKGROUND OF THE INVENTION

1. Field of the Invention

The present invention relates to an information processing apparatus, method, and program. More particularly, the present invention relates to an information processing apparatus, method, and program able to reduce the standby power draw of an HDMI-CEC compatible device.

2. Description of the Related Art

HDMI (High-Definition Multimedia Interface) is becoming more prevalent as a digital interface for high-speed transmission of baseband signals containing a picture (i.e., video) signal as well as an audio signal accompanying the picture signal. The HDMI standard adds audio transmission functions and copyright protection functions to the DVI (Digital Visual Interface) standard for connecting personal computers (PCs) to displays, in an arrangement suitable for audio-visual (AV) equipment (see, for example, the High-Definition Multimedia Interface Specification Version 1.3a, Oct. 30, 2006).

An apparatus connected via HDMI (hereinafter referred to as an HDMI apparatus) may be one of three types: an HDMI source, an HDMI sink, or an HDMI repeater.

An HDMI source is provided with an output port for outputting audio and visual signals via HDMI. An HDMI sink is provided with an input port for accepting audio and visual signals as input via HDMI. An HDMI repeater is provided with one or more input ports and one or more output ports, and acts as both an HDMI source and an HDMI sink to function as a relay between the HDMI source and the HDMI sink.

HDMI includes TMDS (Transition Minimized Differential Signaling) channels, which are used as signal channels for unidirectionally transmitting baseband audio-visual signals from an HDMI source to an HDMI sink, via an HDMI repeater when appropriate. HDMI also has other channels, including a CEC (Consumer Electronics Control) line, which is used as a control channel for bidirectionally transmitting control signals (i.e., messages) used to control the HDMI source, the HDMI sink, and the HDMI repeater when appropriate.

In other words, in the physical layer, HDMI adopts the TMDS channels, with a CEC line being adopted for connecting the control systems of all apparatus connected by HDMI.

Furthermore, HDMI also adopts EDID (Extended Display Identification Data) for inter-device validation.

More specifically, HDMI adopts the VESA (Video Electronics Standards Association) DDC/EDID protocol for inter-device validation.

The DDC (Display Data Channel) is used by the HDMI source to read Enhanced EDID data from the HDMI sink as well as the HDMI repeater.

In other words, the HDMI sink and the HDMI repeater respectively include EDID ROM (Read-Only Memory) that stores EDID information related to that device's configuration and capability. Via the DDC, the HDMI source reads the EDID stored in the respective EDID ROM of the HDMI sink and the HDMI repeater, and on the basis of the EDID, recognizes the configuration and capability of the HDMI sink and the HDMI repeater.

Herein, an AV system will be considered wherein a television receiver (TV) acts as the HDMI sink, an AV amp acts as the HDMI repeater, and a BD (Blu-ray Disc™) recorder acts as the HDMI source.

Each HDMI apparatus constituting this AV system is CEC-compatible. Consequently, the operation of the apparatus are coordinated in accordance with user operations, such as playback operations in the BD recorder acting as the HDMI source, as well as power off or selection operations in the TV acting as the HDMI sink.

By means of an HDMI-TMDS signal transmitted via a TMDS channel (hereinafter also simply referred to as an HDMI signal), it is possible to transmit multi-channel PCM and similar signals that were unavailable for transmission using the optical digital output of the related art. As a result, the EDID of the AV amp is read by the BD recorder acting as the HDMI source, the AV amp receives an HDMI signal from the BD recorder, and only the picture signal contained in the HDMI signal is then transmitted to the TV. More specifically, the AV amp outputs an LPCM 7.1CH or similar high-quality audio signal received from the BD recorder, while additionally transmitting only the picture signal contained in the HDMI signal to the TV.

Moreover, if in a standby or similar mode, the AV amp is also able to transmit input signals to the TV, without the AV amp itself outputting audio. Since in this case the HDMI signal flows from the BD recorder to the AV amp, and then from the AV amp to the TV, the AV amp may simply transmit the HDMI signal received from the BD recorder to the TV as-is, for example. The AV amp thus performs what is referred to as an HDMI pass-through, causing the BD recorder to read the EDID of the TV, and then transmitting the HDMI signal received from the BD recorder to the TV as-is.

SUMMARY OF THE INVENTION

When audio is not to be output from the AV amp (such as when the AV amp is in standby), it is still desirable for the AV amp to conduct HDMI pass-through, regardless of its power state. However, doing so involves supplying power to the HDMI block that sends and receives HDMI signals.

For this reason, the standby power draw of an HDMI repeater incorporating an HDMI pass-through function is greater than that of an HDMI apparatus not incorporating an HDMI pass-through function.

Furthermore, if either the BD recorder acting as the HDMI source or the TV acting as the HDMI sink are powered off, then the AV amp acting as the HDMI repeater may likewise cut power related to HDMI pass-through. However, in such a state, the AV amp is not detected as the HDMI repeater in AV systems of the related art, and thus power is continuously supplied to the HDMI block. For this reason, it has been difficult to enable an AV amp to perform HDMI pass-through while in standby, while also reducing standby power draw.

In light of the foregoing circumstances, it is desirable to provide an apparatus, method, and program able to reduce standby power draw in HDMI-CEC compatible devices.

An information processing apparatus in accordance with an embodiment of the present invention is connected to one or more apparatus via an interface, the interface having a signal channel on which baseband signals are transmitted, as well as a control channel on which control signals used for control are bidirectionally transmitted. The information processing apparatus includes: a baseband signal manager configured to transmit a baseband signal sent from a first apparatus to a second apparatus as-is when the information processing apparatus is in a standby power state; determining means configured to determine the power state of the second apparatus on the basis of a control signal sent from the second apparatus; and power supply controlling means configured such that, when it is determined by the determining means that the second apparatus is not powered on, power supply to the baseband signal manager is suspended.

The determining means may also transmit a control signal to the second apparatus requesting the power state of the second apparatus, and determine the power state of the second apparatus on the basis of a control signal sent from the second apparatus and responding to the request.

The determining means may also transmit the control signal to the second apparatus requesting the power state of the second apparatus, and determine that the second apparatus is not powered on when the responding control signal from the second apparatus is not received within a predetermined amount of time.

The determining means may also transmit the control signal to the second apparatus requesting the power state of the second apparatus, determine that the second apparatus is powered on when a control signal indicating that the second apparatus is powered on is received within a predetermined amount of time, and determine that the second apparatus is not powered on when a control signal indicating that the second apparatus is not powered on is received within a predetermined amount of time.

The determining means may also determine that the second apparatus is powered on for as long as polling messages from the second apparatus are being periodically received without exceeding a predetermined amount of time, and determine that the second apparatus is not powered on when the interval between the receipt of polling messages from the second apparatus has exceeded a predetermined amount of time.

The determining means may also receive a predetermined control signal sent from the first apparatus. When power supply to the baseband signal manager has been suspended, the power supply controlling means may initiate power supply to the baseband signal manager when the determining means receives a control signal from the first apparatus for powering on apparatus connected via the interface.

The determining means may also receive a predetermined control signal sent from the second apparatus. When power supply to the baseband signal manager has been suspended, the power supply controller means may initiate power supply to the baseband signal manager when the determining means receives a control signal from the second apparatus for powering on apparatus connected via the interface.

The determining means may also receive a predetermined control signal from an apparatus other than the first or second apparatus. When power supply to the baseband signal manager has been suspended, the power supply controlling means may initiate power supply to the baseband signal manager when the determining means receives a control signal from an apparatus other than the first or second apparatus for powering on apparatus connected via the interface.

The interface may be HDMI (High Definition Multimedia Interface), and the control signals may be CEC (Consumer Electronics Control) messages.

An information processing method in accordance with another embodiment of the present invention is used in an information processing apparatus. The information processing apparatus is connected to one or more apparatus via an interface, the interface having a signal channel on which baseband signals are transmitted, as well as a control channel on which control signals used for control are bidirectionally transmitted. The information processing apparatus is provided with a baseband signal manager configured to transmit a baseband signal sent from a first apparatus to a second apparatus as-is when the information processing apparatus is in a standby power state. The method includes the steps of: determining the power state of the second apparatus on the basis of a control signal sent from the second apparatus; and when it is determined in the determining step that the second apparatus is not powered on, suspending power supply to the baseband signal manager.

A program in accordance with another embodiment of the present invention causes a computer to execute processing for controlling an information processing apparatus. The information processing apparatus is connected to one or more apparatus via an interface, the interface having a signal channel on which baseband signals are transmitted, as well as a control channel on which control signals used for control are bidirectionally transmitted. The information processing apparatus is provided with a baseband signal manager configured to transmit a baseband signal sent from a first apparatus to a second apparatus as-is when the information processing apparatus is in a standby power state. The processing specified by the program includes the steps of: determining the power state of the second apparatus on the basis of a control signal sent from the second apparatus; and when it is determined in the determining step that the second apparatus is not powered on, suspending power supply to the baseband signal manager.

In an embodiment of the present invention, an information processing apparatus includes a baseband signal manager configured to transmit a signal sent from a first apparatus to a second apparatus as-is when the information processing apparatus is in a standby power state. In this information processing apparatus, the power state of the second apparatus is determined on the basis of a control signal sent from the second apparatus. When it is determined that the second apparatus is not powered on, power supply to the baseband signal manager is suspended.

According to an embodiment of the present invention, it becomes possible to reduce standby power draw in an HDMI-CEC compatible device.

BRIEF DESCRIPTION OF THE DRAWINGS

FIG. 6 explains the relationship between the system-wide power state of an AV amp, and the state of power being supplied to the HDMI block;

FIG. 12 is a flowchart explaining operational flow in an AV system; and

FIG. 13 is a block diagram illustrating an exemplary hardware configuration of a computer.

DESCRIPTION OF THE PREFERRED EMBODIMENTS

Hereinafter, an embodiment of the present invention will be described with reference to the accompanying drawings.

Exemplary Configuration of AV System

Figure 1:
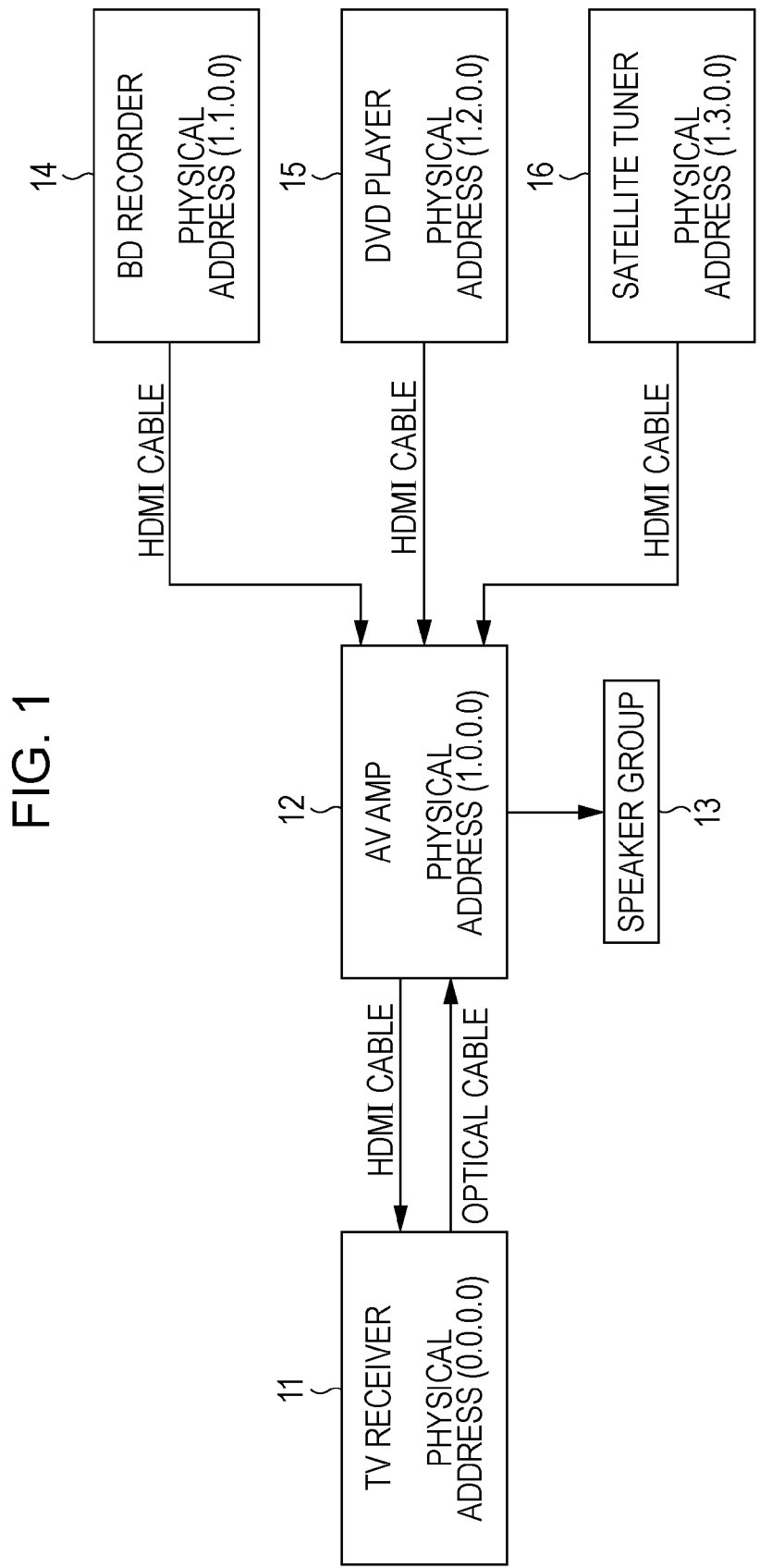
FIG. 1 is a block diagram illustrating an exemplary configuration of an AV system to which an embodiment of the present invention has been applied.

FIG. 1 illustrates an exemplary configuration of an AV system to which an embodiment of the present invention has been applied.

The AV system shown in FIG. 1 includes a television receiver (TV) 11, an AV amp 12, a speaker group 13, a BD recorder 14, a DVD player 15, and a satellite tuner 16.

The TV 11, AV amp 12, BD recorder 14, DVD player 15, and satellite tuner 16 are all HDMI-CEC compatible devices (hereinafter simply referred to as CEC-compatible devices). In the AV system shown in FIG. 1, the TV 11 and the AV amp 12 are connected by an HDMI cable, while the AV amp 12 is respectively connected to the BD recorder 14, the DVD player 15, and satellite tuner 16 by HDMI cables. In the AV system shown in FIG. 1, the TV 11 corresponds to an HDMI sink, the AV amp 12 corresponds to an HDMI repeater, and the BD recorder 14, DVD player 15, and satellite tuner 16 each correspond to an HDMI source.

Furthermore, the TV 11 and the AV amp 12 are connected by an optical digital cable. Via the optical digital cable, the TV 11 supplies optical digital audio signals to the AV amp 12.

A unique physical address is assigned to each CEC-compatible device. In the AV system shown in FIG. 1, the TV 11 is assigned a physical address of (0.0.0.0), the AV amp 12 (1.0.0.0), the BD recorder 14 (1.1.0.0), the DVD player 15 (1.2.0.0), and the satellite tuner 16 (1.3.0.0), respectively.

The AV amp 12 is also connected to a speaker group 13. The speaker group 13 may be, for example, a set of speakers for realizing 5.1 channel surround sound, and including speakers positioned to the front-center, front-right, front-left, rear-right, and rear-left of the user, as well as a subwoofer for bass output.

In the AV system shown in FIG. 1, when the mode for outputting audio (i.e., the system audio mode) of the AV amp 12 is on, the AV amp 12 receives an HDMI signal from the BD recorder 14 or similar device, and then transmits only the picture signal contained in the HDMI signal to the TV 11. If the system audio mode of the AV amp 12 is off, then the AV amp 12 receives an HDMI signal from the BD recorder 14 or similar device, and then transmits the HDMI signal received from the BD recorder 14 or similar device to the TV 11 as-is (i.e., the AV amp 12 conducts an HDMI pass-through).

Furthermore, in the AV system shown in FIG. 1, the TV 11, the AV amp 12, the BD recorder 14, the DVD player 15, and the satellite tuner 16 operate according to user operations performed with respect to individual HDMI apparatus. The devices operate on the basis of CEC messages in the form of control signals sent and received via CEC lines. CEC messages will be later described in more detail.

Exemplary Configuration of Television Receiver

A specific exemplary configuration of the TV 11 will now be described with reference to FIG. 2.

The TV 11 includes a controlled unit 31 as well as a controller 32. Under control by the controller 32, the controlled unit 31 realizes the various functions of the TV 11.

The controlled unit 31 is provided with an HDMI switcher (HDMI SW) 50, an HDMI receiver (HDMI RX) 51, a CEC unit 52, a digital tuner 53, a demultiplexer (DEMUX) 54, an MPEG (Moving Picture Experts Group) decoder 55, a video/graphics processor circuit 56, a panel driver circuit 57, a display panel 58, an audio processor circuit 59, an audio amplifier circuit 60, one or more speakers 61, and a receiver 62. The controller 32 is provided with a CPU (Central Processing Unit) 63, flash ROM 64, DRAM (Dynamic Random Access Memory) 65, and an internal bus 66.

The HDMI switcher 50 selectively connects one of two HDMI ports (not shown in the drawings) to the HDMI receiver 51.

Via the HDMI switcher 50, the HDMI receiver 51 is selectively connected to one of the two HDMI ports (not shown in the drawings). By means of HDMI-compliant communication, the HDMI receiver 51 receives a baseband audio-visual signal (i.e., an HDMI signal) unidirectionally transmitted from an external device (i.e., an HDMI source or an HDMI repeater) connected to one of the two HDMI ports (not shown in the drawings). The HDMI receiver 51 then supplies the picture signal contained in the received HDMI signal to the video/graphics processor circuit 56, while supplying the audio signal contained in the received HDMI signal to the audio processor circuit 59.

On the basis of control by the CPU 63, the CEC unit 52 sends and receives CEC messages via a CEC line connecting the CEC unit 52 to an HDMI repeater or an HDMI source.

The digital tuner 53 processes a television broadcast signal input from an antenna port (not shown in the drawings), and supplies the demultiplexer 54 with a given transport stream (TS) corresponding to a user-selected channel.

From the TS supplied by the digital tuner 53, the demultiplexer 54 extracts a partial TS (i.e., picture signal TS packets and audio signal TS packets) corresponding to the user-selected channel, and supplies the extracted results to the MPEG decoder 55.

Additionally, the demultiplexer 54 retrieves PSI/SI (Program Specific Information/Service Information) from the TS supplied by the digital tuner 53, and supplies the retrieved results to the CPU 63. The TS supplied by the digital tuner 53 contains a plurality of multiplexed channels. By acquiring the packet ID (PID) for an arbitrary channel from the PSI/SI (PAT/PMT), it becomes possible for the demultiplexer 54 to execute the processing to extract the partial TS for that arbitrary channel from the TS.

The MPEG decoder 55 decodes the visual PES (Packetized Elementary Stream) packets made up of the picture signal TS packets supplied by the demultiplexer 54. The picture signal obtained as a result is supplied to the video/graphics processor circuit 56. Additionally, the MPEG decoder 55 decodes the audio PES packets made up of the audio signal TS packets supplied by the demultiplexer 54. The audio signal obtained as a result is supplied to the audio processor circuit 59.

The video/graphics processor circuit 56 subjects a picture signal supplied by the HDMI receiver 51 or the MPEG decoder 55 to various processing as appropriate, such as scaling and overlaying graphics data. The processed results are supplied to the panel driver circuit 57.

On the basis of the picture signal supplied by the video/graphics processor circuit 56, the panel driver circuit 57 drives the display panel 58 and causes a picture to be displayed. The display panel 58 may be, for example, an LCD (Liquid Crystal Display) or a PDP (Plasma Display Panel).

The audio processor circuit 59 subjects an audio signal supplied by the HDMI receiver 51 or the MPEG decoder 55 to various processing as appropriate, such as D/A (Digital to Analog) conversion. The processed results are supplied to the audio amplifier circuit 60.

The audio amplifier circuit 60 amplifies the analog audio signal supplied by the audio processor circuit 59, and supplies the amplified results to the one or more speakers 61. The one or more speakers 61 output audio in accordance with the analog audio signal from the audio amplifier circuit 60.

The receiver 62 receives, for example, an infrared remote control signal sent from a remote control 67, and supplies the received signal to the CPU 63. By operating the remote control 67, the user is able to operate the TV 11, as well as other CEC-compatible devices connected to the TV 11 by HDMI cables.

The CPU 63, flash ROM 64, and DRAM 65 are connected via the internal bus 66. The CPU 63 controls the operation of the various components of the TV 11. The flash ROM 64 stores control software and data. The DRAM 65 constitutes the work area of the CPU 63. In other words, the CPU 63 controls the various components of the TV 11 by loading software and data read from the flash ROM 64 into the DRAM 65, and then launching the software.

Exemplary Configuration of AV Amp

A specific exemplary configuration of the AV amp 12 will now be described with reference to FIG. 3.

Figure 3:
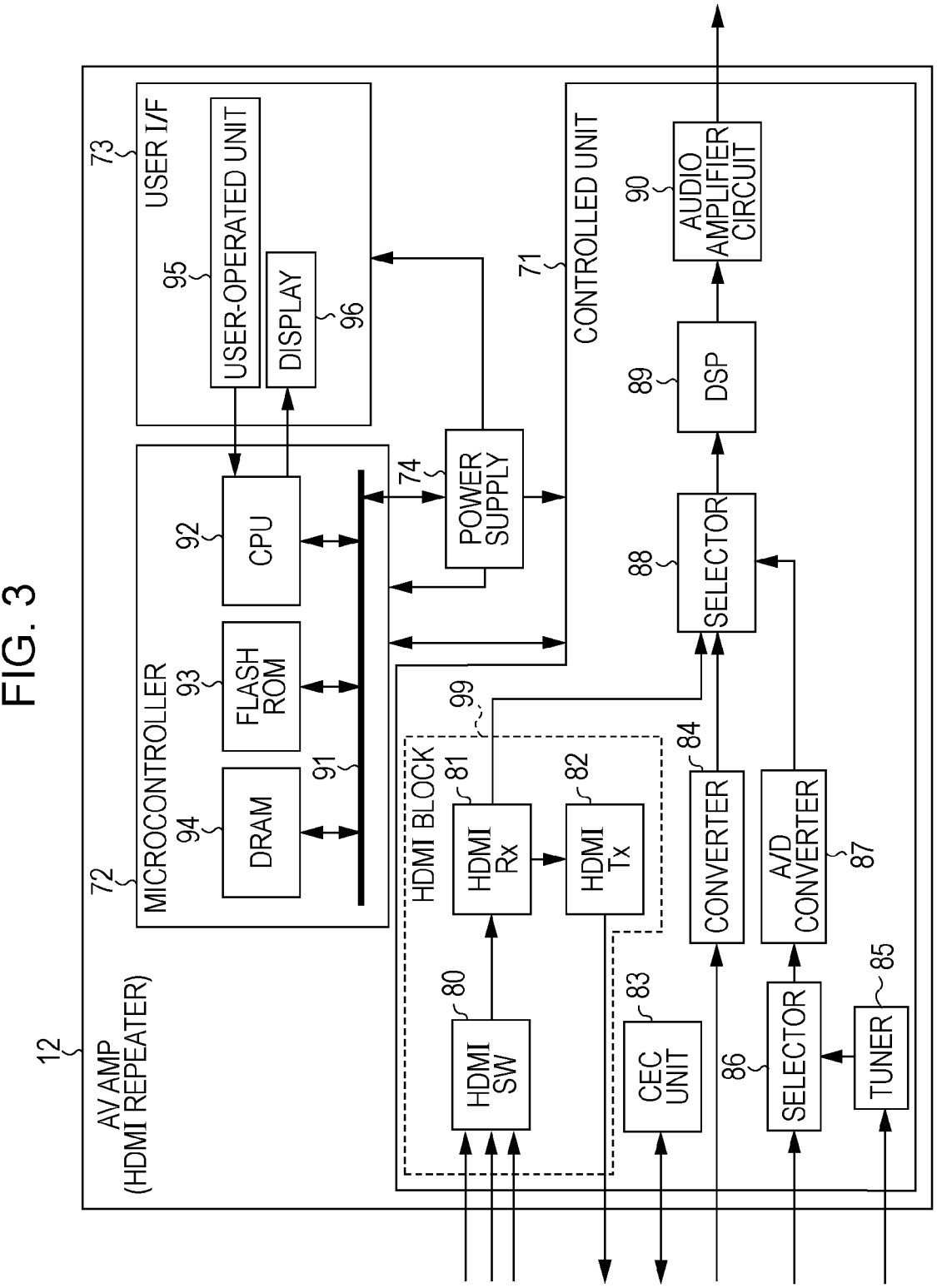
FIG. 3 is a block diagram illustrating an exemplary configuration of an AV amp.

The AV amp 12 shown in FIG. 3 includes a controlled unit 71, a microcontroller 72, a user interface (I/F) 73, and a power supply 74. Under control by the microcontroller 72, the controlled unit 71 realizes the various functions of the AV amp 12. The user I/F 73 is configured to accept signal input in accordance with user operations, while also presenting information to the user. On the basis of control by the microcontroller 72, the power supply 74 supplies power to the controlled unit 71, the microcontroller 72, and the user I/F 73, respectively.

The controlled unit 71 is provided with an HDMI switcher (HDMI SW) 80, an HDMI receiver (HDMI RX) 81, an HDMI transmitter (HDMI TX) 82, a CEC unit 83, a converter 84, a tuner 85, a selector 86, an A/D (Analog to Digital) converter 87, a selector 88, a DSP (Digital Signal Processor) 89, and an audio amplifier circuit 90. The microcontroller 72 is provided with an internal bus 91, a CPU 92, flash ROM 93, and DRAM 94. The user I/F 73 is provided with a user-operated unit 95 and a display 96.

The portion of the configuration made up of the HDMI switcher 80, HDMI receiver 81, and HDMI transmitter 82 will be hereinafter referred to as the HDMI block 99. When the system audio mode is off, the HDMI block 99 receives an HDMI signal from the BD recorder 14, and then transmits the HDMI signal received from the BD recorder 14 to the TV 11 as-is (i.e., the HDMI block 99 conducts an HDMI passthrough).

The HDMI switcher 80 selectively connects one of a plurality of HDMI ports (not shown in the drawings) to the HDMI receiver 81.

Via the HDMI switcher 80, the HDMI receiver 81 is selectively connected to one of the plurality of HDMI ports (not shown in the drawings). By means of HDMI-compliant communication, the HDMI receiver 81 receives a baseband audio-visual signal (i.e., an HDMI signal) unidirectionally transmitted from an external device (i.e., an HDMI source) connected to one of the plurality of HDMI ports (not shown in the drawings). The HDMI receiver 81 then supplies the audio signal contained in the received HDMI signal to the selector 88, while also supplying the received HDMI signal to the HDMI transmitter 82 as-is.

By means of HDMI-compliant communication, the HDMI transmitter 82 sends out the baseband audio-visual signal (i.e., the HDMI signal) supplied by the HDMI receiver 81. The HDMI signal is sent out from an HDMI port (not shown in the drawings).

As a result of the above configuration, the AV amp 12 functions as an HDMI repeater.

On the basis of control by the CPU 92, the CEC unit 83 sends and receives CEC messages via a CEC line connecting the CEC unit 83 to an HDMI sink or an HDMI source.

The converter 84 generates the following from an optical digital signal input from an optical input port (not shown in the drawings): a clock LRCK having a frequency identical to the sampling frequency of the audio signal (44.1 kHz, for example); a master clock MCK having a frequency that is a multiple of the sampling frequency, such as 512 or 256 times the sampling frequency; 24-bit left and right audio data LDATA and RDATA, with data values existing at every period of the clock LRCK; and a bit clock BCK synchronized to each bit of the data. The clocks and data thus generated are supplied to the selector 88.

The tuner 85 processes an FM broadcast signal input from an antenna port (not shown in the drawings). The FM broadcast signal is input via the antenna input port after being received by an FM receive antenna (not shown in the drawings). The tuner 85 then supplies the selector 86 with left and right analog audio signals corresponding to a user-selected channel.

The selector 86 selectively retrieves analog audio signals supplied from the tuner 85, or input from an analog audio input port (not shown in the drawings). Left and right analog audio signals are input via the analog audio input port after being supplied from an external device (not shown in the drawings). The selector 86 then supplies the retrieved analog audio signals to the A/D converter 87.

The A/D converter 87 converts analog audio signals supplied from the selector 86 into digital audio signals, and supplies the results to the selector 88.

The selector 88 selectively retrieves audio signals supplied from the HDMI receiver 81, audio signals supplied from the converter 84, or audio signals supplied from the A/D converter 87, and supplies the retrieved results to the DSP 89.

The DSP 89 processes audio signals supplied by the selector 88. For example, the DSP 89 may execute processing to generate per-channel audio signals for realizing 5.1 channel, processing to apply certain soundstage characteristics, or processing to convert digital signals into analog signals. The processed results are supplied to the audio amplifier circuit 90.

The audio amplifier circuit 90 amplifies audio signals supplied by the DSP 89. In the present case, front-left, front-right, front-center, rear-left, rear-right, and subwoofer audio signals are amplified. The amplified results are then output via an audio output port (not shown in the drawings). The audio output port not shown in the drawings is connected to front-left, front-right, front-center, rear-left, rear-right speakers as well as a subwoofer, which together constitute the speaker group 13.

The CPU 92, flash ROM 93, and DRAM 94 are connected via the internal bus 91. The CPU 92 controls the operation of the various components of the AV amp 12. The flash ROM 93 stores control software and data. The DRAM 94 constitutes the work area of the CPU 92. The CPU 92 controls the various components of the AV amp 12 by loading software and data read from the flash ROM 93 into the DRAM 94, and then launching the software.

Also connected to the CPU 92 are the user-operated unit 95 and the display 96.

The user-operated unit 95 includes elements such as keys, buttons, and dials arranged on the chassis of the AV amp 12, as well as a remote control. The display 96 is realized by means of an LCD and power lamps or similar elements provided separately from the LCD. The display 96 displays various states, such as the operational state of the AV amp 12, the state of user operations, and the power state of the power supply 74. By operating the user-operated unit 95, the user is able performs actions such as selecting the audio to be output from the AV amp 12 and setting the volume therefor, selecting a channel for the tuner 85, configure operational settings, and configure CONTROL FOR HDMI settings (to be described later).

Exemplary Configuration of BD Recorder

A specific exemplary configuration of the BD recorder 14 will now be described with reference to FIG. 4.

Figure 4:
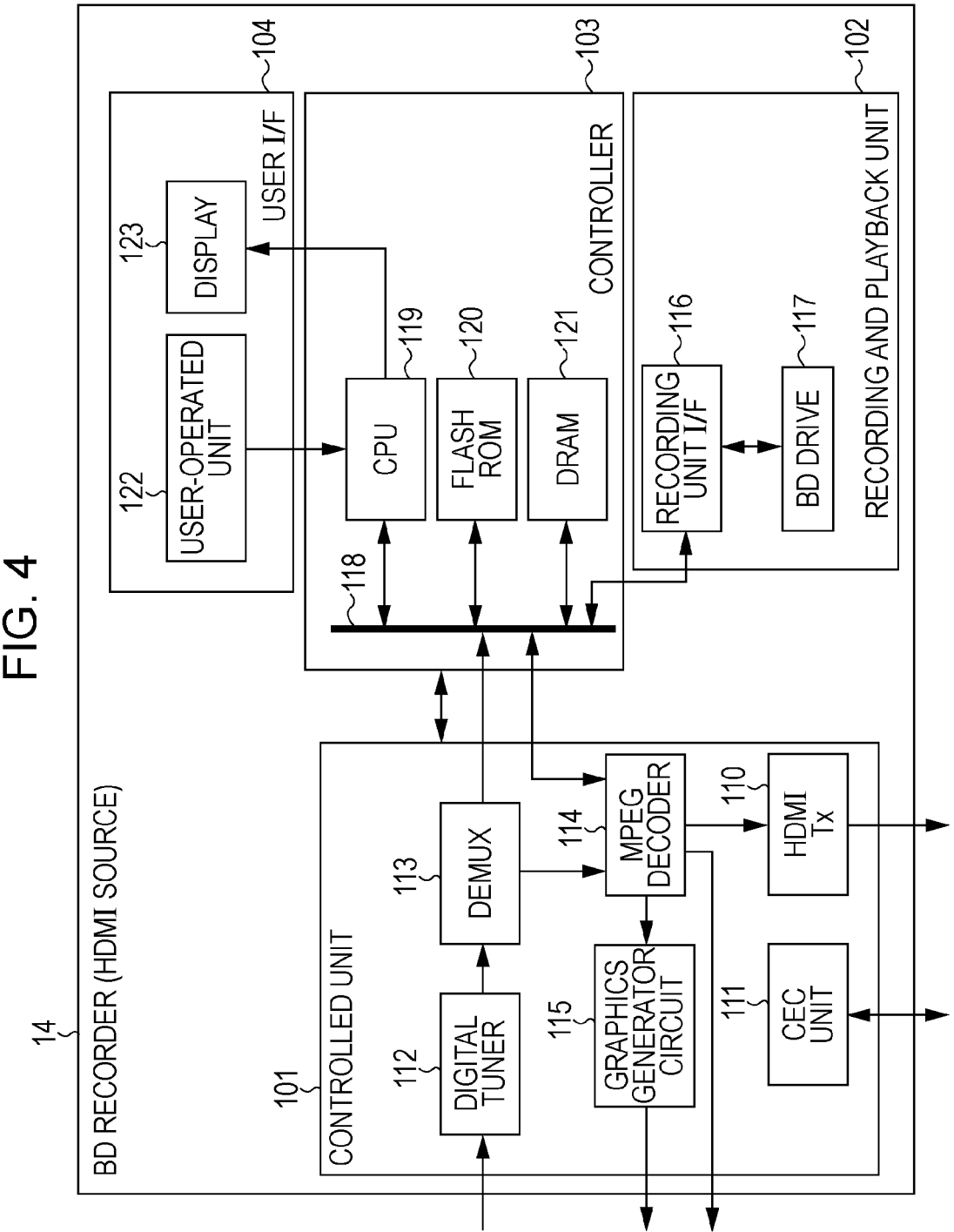
FIG. 4 is a block diagram illustrating an exemplary configuration of a BD recorder.

The BD recorder 14 shown in FIG. 4 includes a controlled unit 101, a recording and playback unit 102, a controller 103, and a user I/F 104. Under control by the controller 103, the controlled unit 101 realizes the various functions of the BD recorder 14. The recording and playback unit 102 records and plays back television broadcast signals that have been input into the BD recorder 14 and processed in a predetermined way. The user I/F 104 is configured to accept signal input in accordance with user operations, while also presenting information to the user.

The controlled unit 101 is provided with an HDMI transmitter (HDMI TX) 110, a CEC unit 111, a digital tuner 112, a demultiplexer (DEMUX) 113, an MPEG decoder 114, and a graphics generator circuit 115. The recording and playback unit 102 is provided with a recording unit I/F 116 and a BD drive 117. The controller 103 is provided with an internal bus 118, a CPU 119, flash ROM 120, and DRAM 121. The user I/F 104 is provided with a user-operated unit 122 and a display 123.

By means of HDMI-compliant communication, the HDMI transmitter 110 sends out a baseband audio-visual signal (i.e., an HDMI signal) supplied by the MPEG decoder 114. The HDMI signal is sent out from an HDMI port (not shown in the drawings).

On the basis of control by the CPU 119, the CEC unit 111 sends and receives CEC messages via a CEC line connecting the CEC unit 111 to an HDMI sink or an HDMI repeater.

The digital tuner 112 processes a television broadcast signal input from an antenna port (not shown in the drawings). The television broadcast signal is input via the antenna port after being received by a receive antenna (not shown in the drawings). The digital tuner 112 then supplies the demultiplexer 113 with a given TS.

From the TS supplied by the digital tuner 112, the demultiplexer 113 extracts a partial TS (i.e., picture signal TS packets and audio signal TS packets) corresponding to particular selected channel, and supplies the extracted results to the MPEG decoder 114.

Additionally, the demultiplexer 113 retrieves PSI/SI from the TS supplied by the digital tuner 112, and supplies the retrieved results to the CPU 119. The TS supplied by the digital tuner 112 contains a plurality of multiplexed channels. By acquiring the packet ID (PID) for an arbitrary channel from the PSI/SI (PAT/PMT), it becomes possible for the demultiplexer 113 to execute the processing to extract the partial TS for that arbitrary channel from the TS.

The MPEG decoder 114 decodes visual PES (Packetized Elementary Stream) packets constituting a partial TS that has been extracted by the demultiplexer 113 or played back by the BD drive 117. The picture signal obtained as a result is supplied to the graphics generator circuit 115. Additionally, the MPEG decoder 114 decodes audio PES packets constituting the partial TS. The audio signal obtained as a result is output via an audio output port (not shown in the drawings).

The graphics generator circuit 115 processes the picture signal supplied by the MPEG decoder 114 so as to overlay graphics or perform other operations as appropriate. The processed results are output via a picture signal output port (not shown in the drawings).

The BD drive 117 is connected to the internal bus 118 via the recording unit I/F 116. When recording, the BD drive 117 records a partial TS extracted by the demultiplexer 113 to a BD. When playing back, the BD drive 117 plays back a partial TS previously recorded onto a BD.

The CPU 119, flash ROM 120, and DRAM 121 are connected via the internal bus 118. The CPU 119 controls the operation of the various components of the BD recorder 14. The flash ROM 120 stores control software and data. The DRAM 121 constitutes the work area of the CPU 119. In other words, the CPU 119 controls the various components of the BD recorder 14 by loading software and data read from the flash ROM 120 into the DRAM 121, and then launching the software.

Also connected to the CPU 119 are the user-operated unit 122 and the display 123. The user-operated unit 122 includes elements such as keys, buttons, and dials arranged on the chassis of the BD recorder 14, as well as a remote control. The display 123 includes an LCD or similar components, and displays various states, such as the operational state of the BD recorder 14 and the state of user operations. By operating the user-operated unit 122, the user is able to control the operation of the BD recorder 14.

Exemplary Functional Configuration of AV System

An exemplary functional configuration of the AV system shown in FIG. 1 will now be described with reference to FIG. 5. In the AV system shown in FIG. 5, identical names and reference numbers have been given to portions of the configuration that are the same as those of the TV 11 in FIG. 2, the AV amp 12 in FIG. 3, and BD recorder 14 in FIG. 4, and further description of such portions is omitted herein where appropriate.

Figure 5:
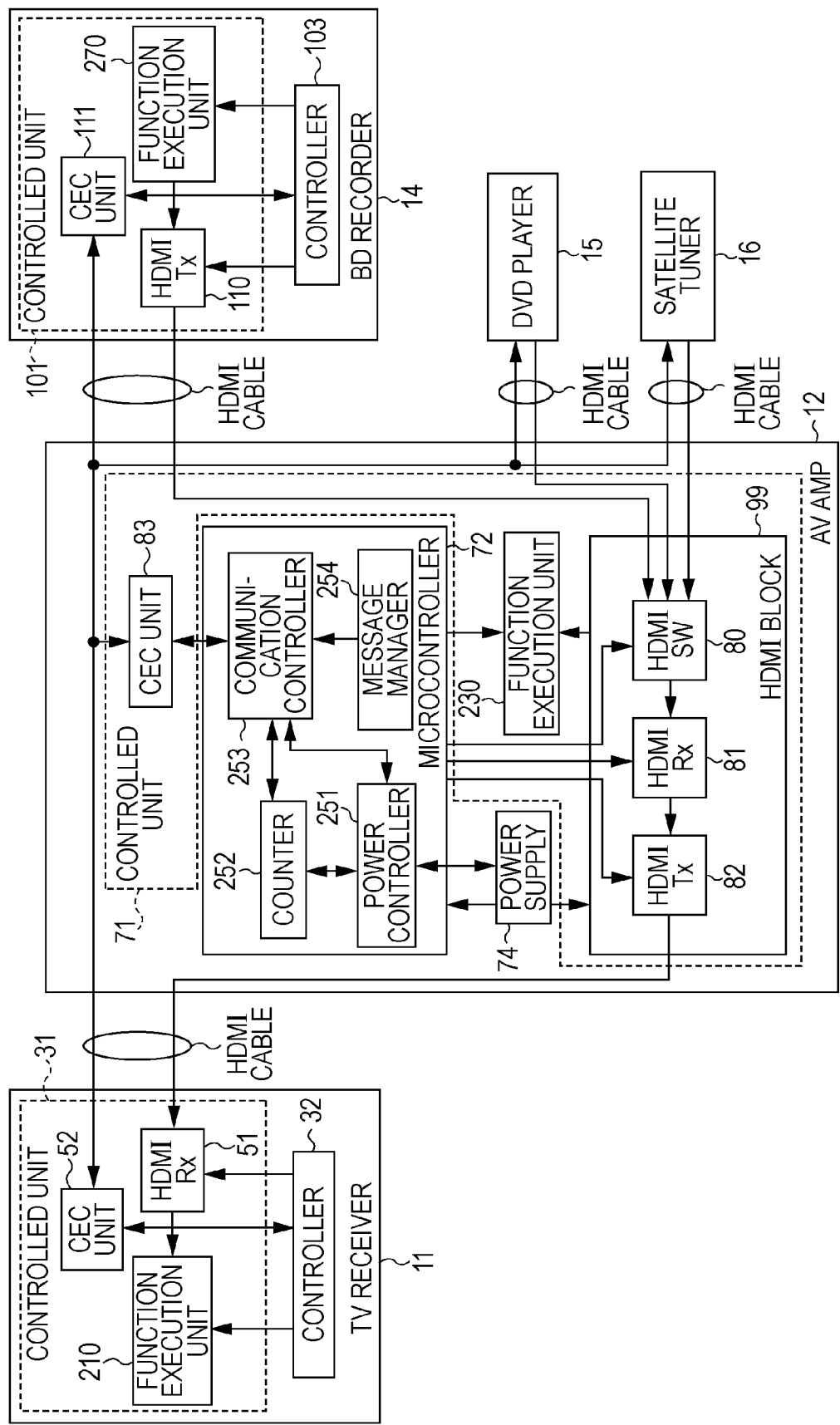
FIG. 5 is a block diagram illustrating an exemplary configuration of an AV system.

The TV 11 shown in FIG. 5 is configured to include the controlled unit 31 and the controller 32.

The controlled unit 31 is provided with the HDMI receiver 51, the CEC unit 52, and a function execution unit 210.

Figure 2:
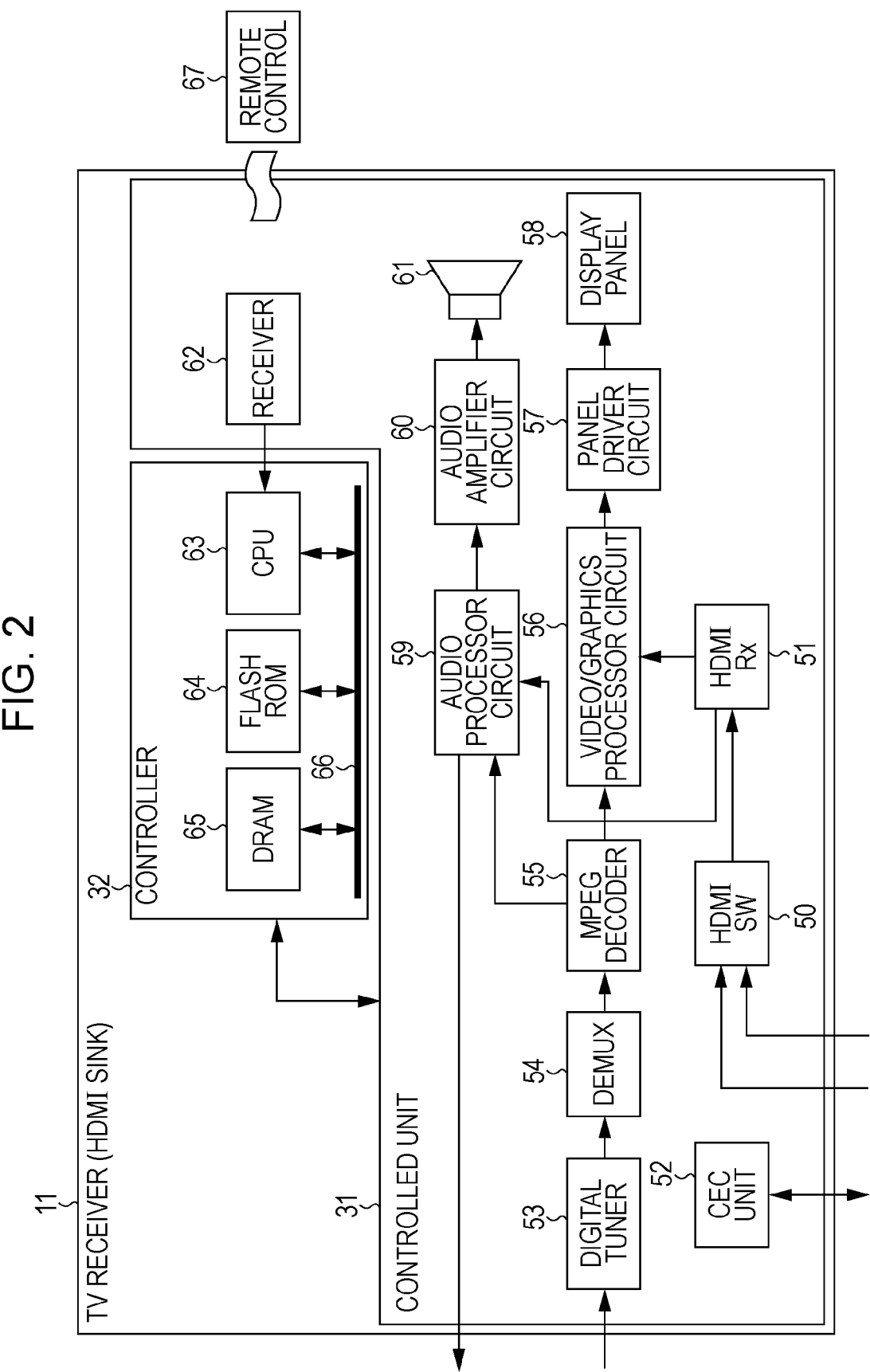
FIG. 2 is a block diagram illustrating an exemplary configuration of a TV.

The function execution unit 210 corresponds to the controlled unit 31 of the TV 11 shown in FIG. 2, with the exception of the HDMI receiver 51 and the CEC unit 52. Under control by the controller 32, the function execution unit 210 realizes the various functions of the TV 11.

The AV amp 12 shown in FIG. 5 is configured to include the controlled unit 71, the microcontroller 72, and the power supply 74.

The controlled unit 71 is provided with the CEC unit 83, the HDMI block 99, and a function execution unit 230.

The function execution unit 230 corresponds to the controlled unit 71 of the AV amp 12 shown in FIG. 3, with the exception of the HDMI switcher 80, the HDMI receiver 81, the HDMI transmitter 82, and the CEC unit 83. Under control by the microcontroller 72, the function execution unit 230 realizes the various functions of the AV amp 12.

The microcontroller 72 corresponds to the microcontroller 72 of the AV amp 12 shown in FIG. 3, and is provided with a power controller 251, a counter 252, a communication controller 253, and a message manager 254.

The power controller 251 controls the supply of power from the power supply 74, and controls how power is supplied to the various components of the AV amp 12. For example, the power controller 251 controls how power is supplied to the HDMI block 99 on the basis of power-related instructions for the HDMI block 99 that are supplied by the counter 252 and the communication controller 253.

The counter 252 counts the intervals (i.e., the amount of time) between received CEC messages in the CEC unit 83, as controlled by the communication controller 253.

The communication controller 253 controls the sending and receiving of CEC messages in the CEC unit 83. For example, in accordance with a count value in the counter 252, the communication controller 253 may cause the CEC unit 83 to read and then transmit a CEC message read from the message manager 254 where such CEC messages are stored. The communication controller 253 may also supply the power controller 251 with power-related instructions for the HDMI block 99, in accordance with a CEC message received by the CEC unit 83.

The BD recorder 14 shown in FIG. 5 is configured to include the controlled unit 101 and the controller 103.

The controlled unit 101 is provided with the HDMI transmitter 110, the CEC unit 111, and a function execution unit 270.

The function execution unit 270 corresponds to the controlled unit 101 of the BD recorder 14 shown in FIG. 4, with the exception of the HDMI transmitter 110 and the CEC unit 111. Under control by the controller 103, the function execution unit 270 realizes the various functions of the BD recorder 14.

Since the functions and configurations of the DVD player 15 and the satellite tuner 16 are basically similar to those of the BD recorder 14, their description is omitted herein. Hereinafter, when describing processes pertaining to the BD recorder 14 as well as the DVD player 15 and the satellite tuner 16, the description will focus on the BD recorder 14 where appropriate.

Relationship Between the System-Wide Power State of the AV Amp, And the State of Power Being Supplied To the HDMI Block FIG. 6 will now be used to explain the relationship between the system-wide power state of the AV amp 12 and the state of power being supplied to the HDMI block 99.

In FIG. 6, the system-wide power state (SYSTEM POWER) of the AV amp 12 is shown in relation to the color of a power lamp (POWER LED) in the display 96, as well as to the state of power being supplied to the HDMI block 99. The system-wide power has three states: POWER ON, OFF, and ACTIVE STANDBY. The supply of power to the HDMI block 99 changes according to the system-wide power state.

More specifically, when the state of SYSTEM POWER is POWER ON (i.e., when the AV amp 12 is powered on), then the power lamp lights green, and power is supplied to the HDMI block 99 (Y). In other words, in this state, power is continuously supplied to the HDMI block 99.

When not powered on, the AV amp may be in one of two states, OFF or ACTIVE STANDBY, depending on the state of CONTROL FOR HDMI (i.e., whether or not control of the operation of the HDMI block 99 has been activated). The state of power being supplied to the HDMI block 99 differs between the OFF and ACTIVE STANDBY states.

More specifically, if the AV amp 12 is powered off while CONTROL FOR HDMI is OFF, then SYSTEM POWER also switches to OFF, and the power lamp is extinguished. At this point, power supply to the HDMI block 99 is "N" (i.e., power is not supplied to the HDMI block 99).

In contrast, if the AV amp 12 is powered off while CONTROL FOR HDMI is ON, then SYSTEM POWER switches to ACTIVE STANDBY, and the power lamp lights amber. At this point, power supply to the HDMI block 99 may be "Y" or "N", and is subject to power supply control by the power controller 251, to be hereinafter described.

The present embodiment is configured such that the state of power supply to the HDMI block 99 is not indicated by the power lamp. However, in the above control state, the power lamp may be made to light amber only when power supply to the HDMI block 99 is "Y", with the power lamp being extinguished when "N". In so doing, the state of power supply to the HDMI block 99 may be indicated.

The above control of the power supply to the HDMI block 99 may also be selectively enabled or disabled by means of a predetermined setting in the AV amp 12. In other words, if the function setting is disabled, then power is continuously supplied to the HDMI block while in the ACTIVE STANDBY state, whereas if the function setting is enabled, the AV amp 12 operates as described above.

In this way, in the AV amp 12 shown in FIG. 5, power supply to the HDMI block 99 changes according the system-wide power state of the AV amp 12. More specifically, power supply to the HDMI block 99 is controlled when the system-wide power state of the AV amp 12 is in a standby state.

Process For Controlling Power Supply To HDMI Block

A process for controlling power supply to the HDMI block 99 of the AV amp 12 in the AV system shown in FIG. 5 will now be described with reference to the flowcharts shown in FIGS. 7 to 11.

Figure 7:
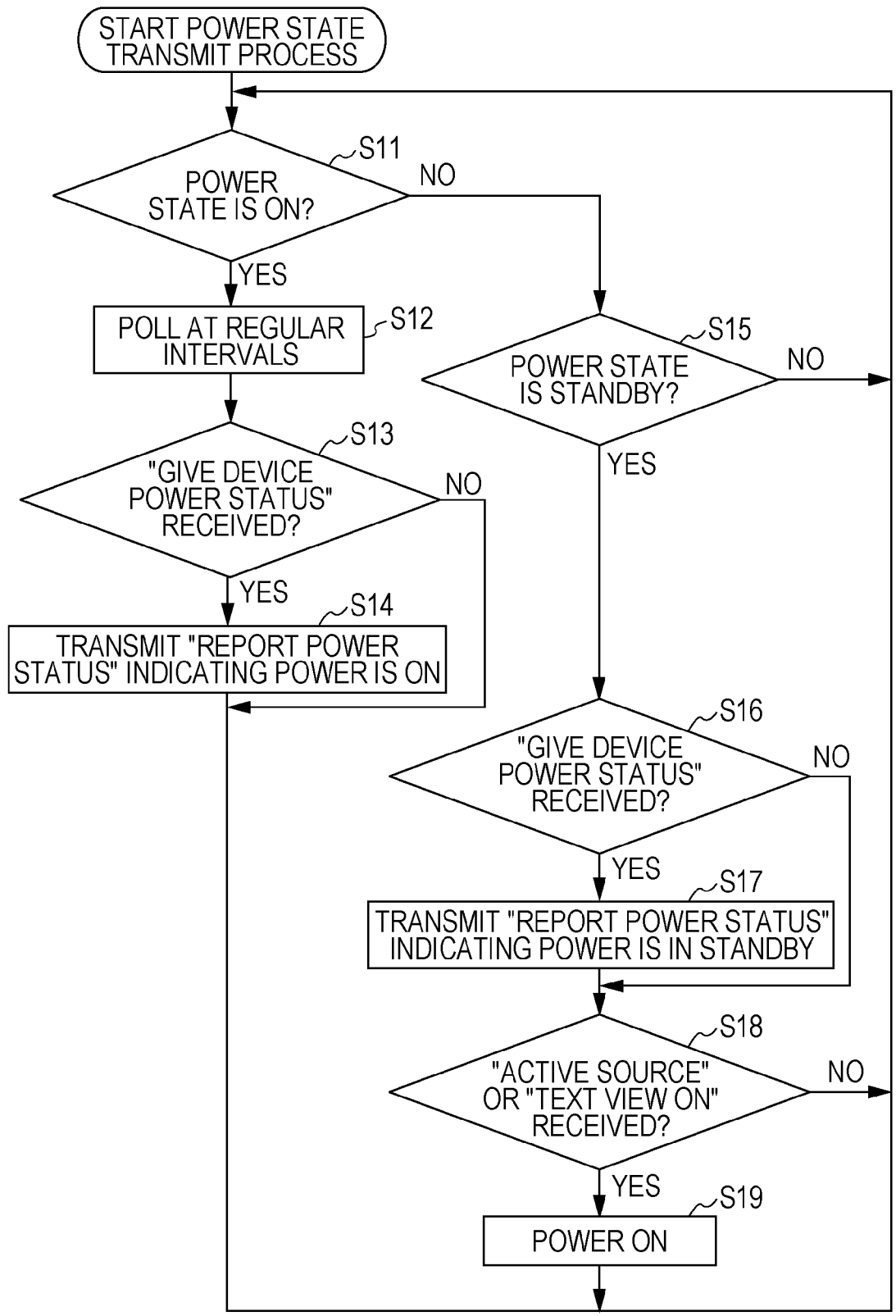
FIG. 7 is a flowchart explaining a process conducted by a TV for transmitting its power state.
Figure 8:
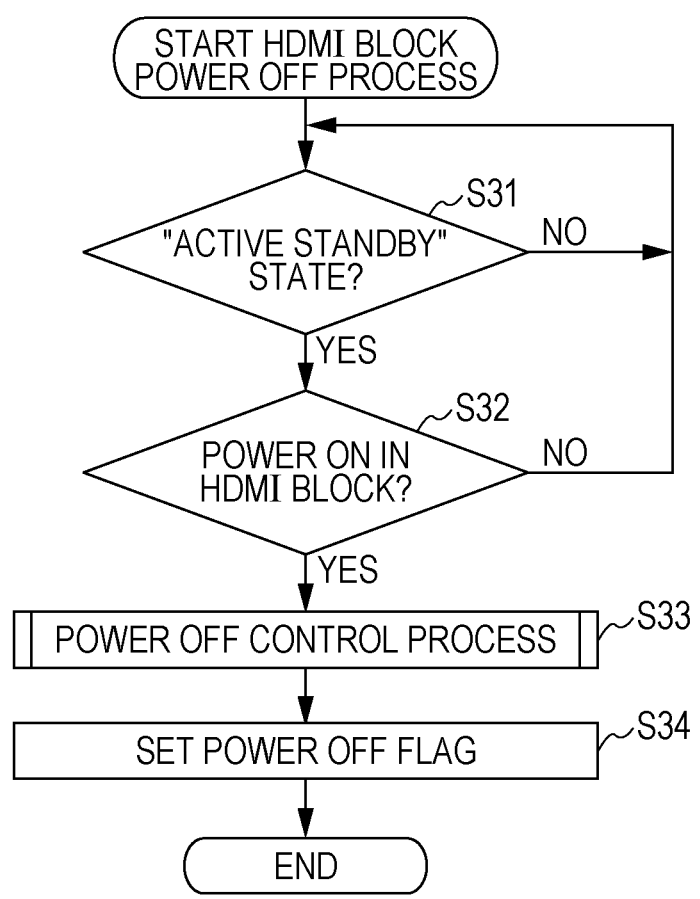
FIG. 8 is a flowchart explaining a process conducted by an AV amp for powering off its HDMI block.
Figure 9:
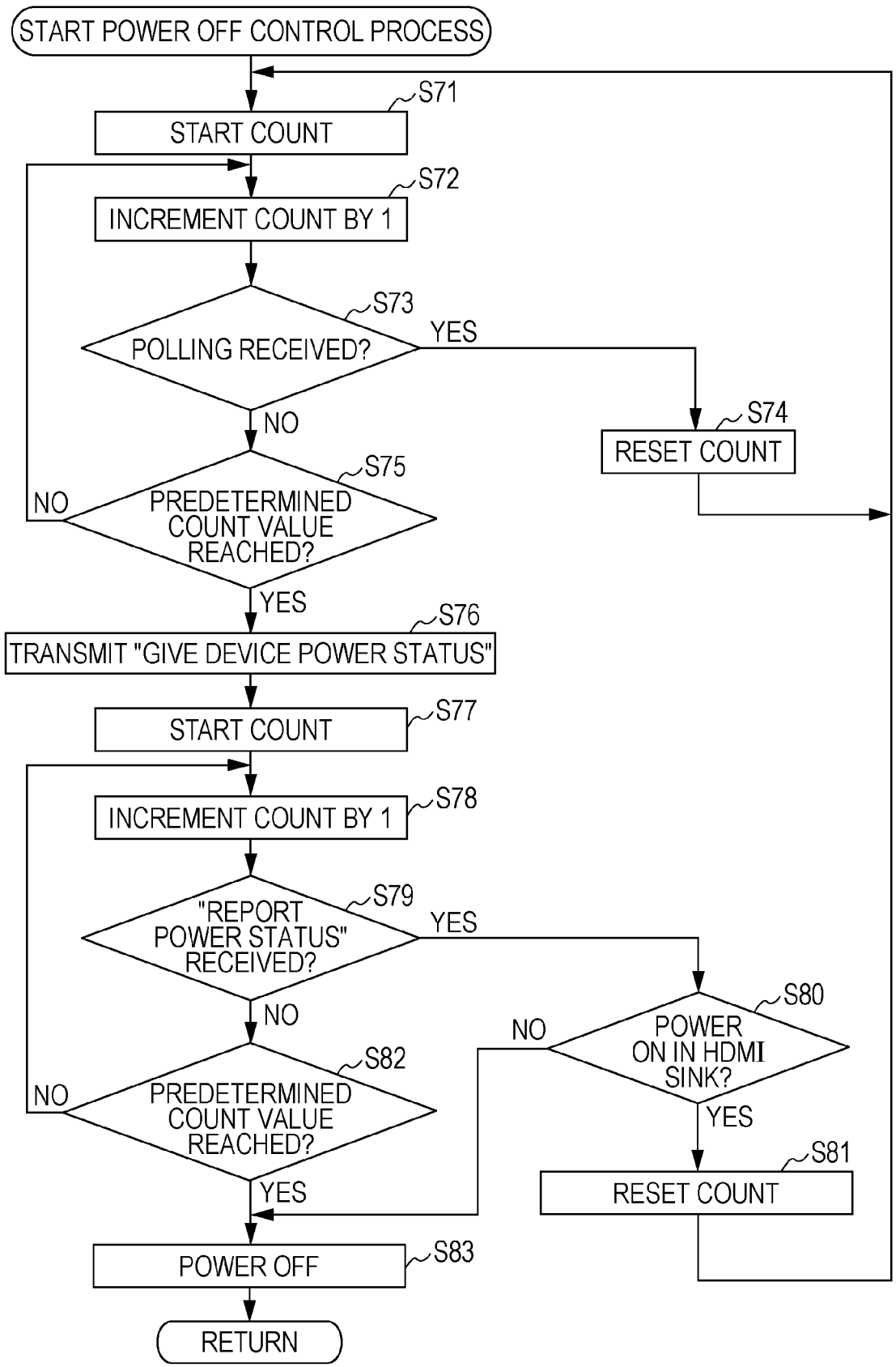
FIG. 9 is a flowchart explaining a process conducted by an AV amp for controlling the powering off of its HDMI block.
Figure 10:
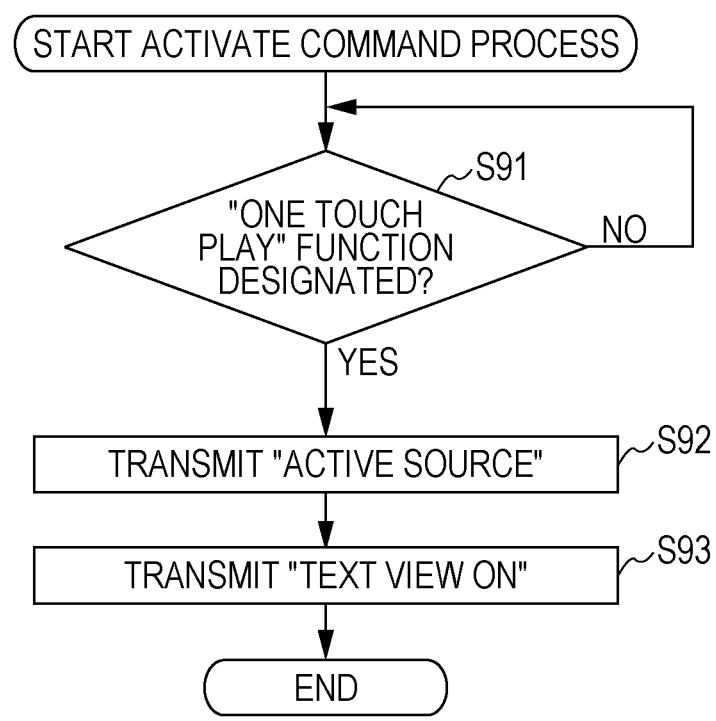
FIG. 10 is a flowchart explaining a process conducted by a BD recorder for issuing an activation command.
Figure 11:
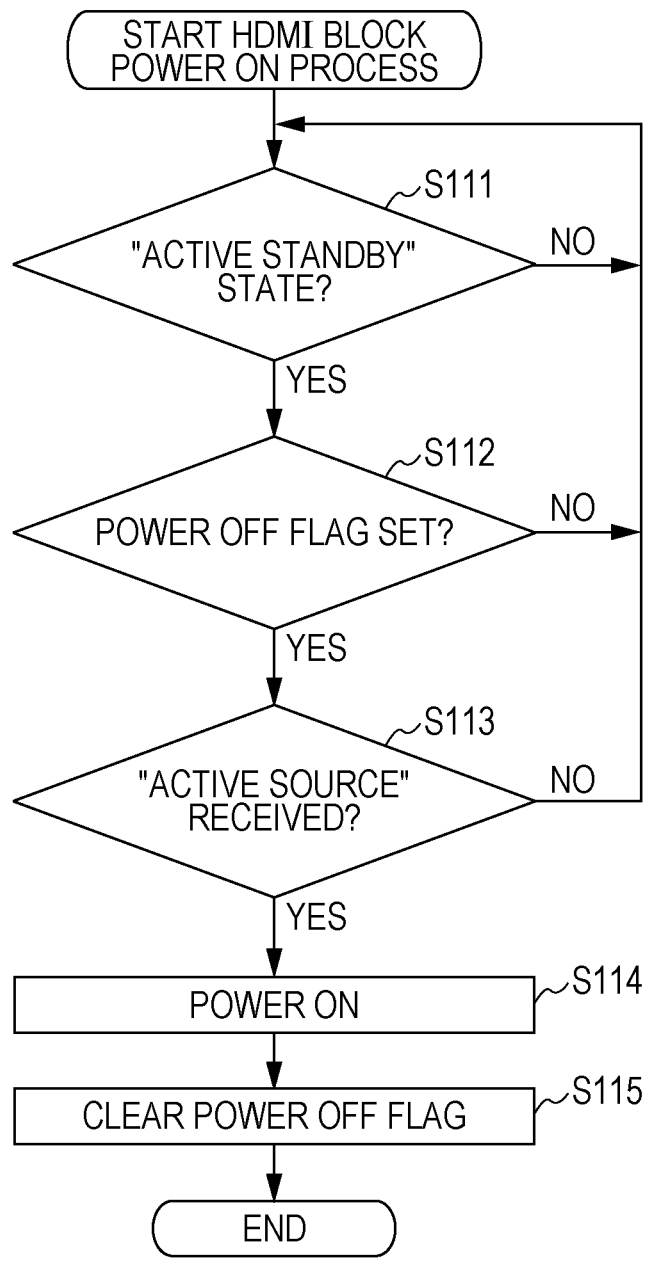
FIG. 11 is a flowchart explaining a process conducted by an AV amp for powering on its HDMI block.

FIG. 7 is a flowchart explaining a process conducted by the TV 11 for transmitting its power state. FIG. 8 is a flowchart explaining a process conducted by the AV amp 12 for powering off its HDMI block 99. FIG. 9 is a flowchart detailing the process for controlling the powering off the HDMI block 99 that is conducted in step S33. FIG. 10 is a flowchart explaining a process conducted by the BD recorder 14 for issuing a command to activate the TV 11. FIG. 11 is a flowchart explaining a process conducted by the AV amp 12 for powering on its HDMI block 99.

In step S11, the controller 32 of the TV 11 determines whether or not the system-wide power state of the TV 11 is "ON".

For example, if the user has powered on the TV 11 and is viewing a given program, then in step S11 it is determined that the power state is "ON", and the process proceeds to step S12. It should be appreciated that in addition to the "ON", "OFF", and "STANDBY" states, the power states of the TV 11 actually include states such as "IN TRANSITION STANDBY TO ON" and "IN TRANSITION ON TO STANDBY". However, such states have not been illustrated in FIG. 7, and are herein omitted from description.

In step S12, the controller 32 causes the CEC unit 52 to output a periodic polling message. More specifically, the controller 32 causes the CEC unit 52 to periodically transmit a type of CEC message referred to as "POLLING MESSAGE". Herein, "POLLING MESSAGE" is a CEC message transmitted to an HDMI apparatus connected via HDMI when a CEC-compatible device detects another CEC-compatible device. Herein, for example, the CEC unit 52 may transmit a "POLLING MESSAGE" once every 15 seconds in order to detect HDMI apparatus connected via HDMI (i.e., the AV amp 12, the BD recorder 14, the DVD player 15, and the satellite tuner 16).

In step S31 (FIG. 8), the power controller 251 of the AV amp 12 uses the state of power supply to its various components as a basis for determining whether or not the system-wide power state of the AV amp 12 is ACTIVE STANDBY (i.e., the standby state).

If it is determined in step S31 that the system-wide power state of the AV amp 12 is not ACTIVE STANDBY (i.e., that the power state of the AV amp 12 is POWER ON or OFF), then the processing in step S31 is repeated until the power state becomes ACTIVE STANDBY. During this time, the power lamp of the display 96 is lit green or extinguished.

In contrast, if it is determined in step S31 that the system-wide power state of the AV amp 12 is ACTIVE STANDBY, then the process proceeds to step S32, and the power controller 251 determines whether or not the HDMI block 99 is powered on.

If it is determined in step S32 that the HDMI block 99 is powered on, then the process proceeds to step S33, and the microcontroller 72 executes the control process for powering off the HDMI block 99. At this point, the power lamp of the display 96 is lit amber.

If it is determined in step S32 that the HDMI block 99 is not powered on, then the process returns to step S31.

The control process for powering off the HDMI block 99 will now be described in detail.

In step S71 (FIG. 9), the counter 252 of the AV amp 12 starts a count. In other words, the counter 252 starts a count when the system-wide power state of the AV amp 12 enters standby. In step S72, the counter 252 increments the count value by 1.

In step S73, the communication controller 253 determines whether or not the CEC unit 83 has received a polling message from the TV 11. More specifically, the communication controller 253 determines whether or not the CEC unit 83 has received the "POLLING MESSAGE" that was transmitted by the TV 11 as a result of the processing in step S12 (FIG. 7).

In this case (i.e., in the case where the AV amp 12 is connected to a TV 11 that is powered on), it is determined in step S73 (FIG. 9) that a polling message has been received. The process thus proceeds to step S74, and the counter 252 of the AV amp 12 resets the count value counted up to this point, returns to step S71, and restarts the count.

However, in other cases (such as the case where the AV amp 12 is connected to a TV 11 that is powered off), it may be determined in step S73 that a polling message has not been received within a set amount of time. In such a case, the process proceeds to step S75.

In step S75, the counter 252 determines whether or not the count value being counted has reached a predetermined count value. For example, the counter 252 may increment the count by 1 every second, and the predetermined count value may be 31. In this case, the counter 252 determines whether or not the count value has reached 31, or in other words, whether or not a predetermined amount of time (31 seconds, in this case) has elapsed since initiating the count.

If, for example, it is determined in step S75 that the count value has not reached 31 (i.e., 31 seconds have not elapsed since initiating the count in step S71), then the process returns to step S72, the count value is incremented by 1, and then it is again determined whether or not the polling message sent once every 15 seconds has been received. At this point, if it is determined that a polling message has been received, then the count value is reset in step S74. Otherwise, the counter 252 increments the count value by 1 every second for as long as it continues to be determined that a polling message has not been received.

The processing in steps S71 to S75 is thus repeated for as long as the counter 252 of the AV amp 12 continues to periodically receive polling messages from the TV 11. During this time, the AV amp 12 does not check the power state of the TV 11 according to "GIVE DEVICE POWER STATUS", to be hereinafter described.

In contrast, if the count value reaches 31, for example, and it is determined in step S75 that 31 seconds have elapsed since initiating the count in step S71, then the process proceeds to step S76. In other words, the process proceeds to step S76 when the "POLLING MESSAGE", which should be transmitted twice every 30 seconds, is not received at all in 31 seconds.

In step S76, the communication controller 253 reads a CEC message referred to as "GIVE DEVICE POWER STATUS" from the message manager 254, and causes the CEC unit 83 to transmit the above message to the TV 11. Herein, "GIVE DEVICE POWER STATUS" is a CEC message transmitted via HDMI by a CEC-compatible device to another particular CEC-compatible device, in order to request the current power state of that CEC-compatible device.

In step S77, the counter 252 starts a count once the CEC unit 83 transmits "GIVE DEVICE POWER STATUS" to the TV 11. In step S78, the counter 252 resets the count value, while also newly incrementing the count value by 1.

In step S13 (FIG. 7), the controller 32 of the TV 11 determines whether or not the CEC unit 52 has received the "GIVE DEVICE POWER STATUS" transmitted from the AV amp 12.

If it is determined in step S13 that "GIVE DEVICE POWER STATUS" has not been received, then the process skips step S14 and returns to step S11.

In contrast, if it is determined in step S13 that "GIVE DEVICE POWER STATUS" has been received, then the process proceeds to step S14.

In step S14, the controller 32 causes the CEC unit 52 to transmit a CEC message referred to as "REPORT POWER STATUS". Herein, "REPORT POWER STATUS" is a CEC message transmitted to a CEC-compatible device that has transmitted "GIVE DEVICE POWER STATUS" in order to respond with the current power state.

More specifically, "REPORT POWER STATUS" has four different parameters for indicating the current power state: "ON", "STANDBY", "IN TRANSITION STANDBY TO ON", and "IN TRANSITION ON TO STANDBY". "ON" indicates that the device is currently powered on, while "STANDBY" indicates that the device is currently in standby. "IN TRANSITION STANDBY TO ON" indicates that the device is currently transitioning from being in standby to being powered on, while "IN TRANSITION ON TO STANDBY" indicates that the device is currently transitioning from being powered on to being in standby.

Herein, the TV 11 is powered on, and so in step S14, the controller 32 causes the CEC unit 52 to transmit "REPORT POWER STATUS" with the parameter "ON" to the AV amp 12. The process then returns to step S11.

In step S79 (FIG. 9), the communication controller 253 of the AV amp 12 determines whether or not the CEC unit 83 has received "REPORT POWER STATUS", which transmitted from the TV 11 as a result of the processing in step S14 (FIG. 7).

In this case, it is determined that "REPORT POWER STATUS" has been received from the TV 11, and the process proceeds to step S80.

In step S80, the communication controller 253 uses the parameter of the "REPORT POWER STATUS" received by the CEC unit 83 as a basis for determining whether or not the TV 11 is powered on. More specifically, the communication controller 253 determines whether or not the parameter of the "REPORT POWER STATUS" received by the CEC unit 83 from the TV 11 is "ON" or "IN TRANSITION STANDBY TO ON". The communication controller 253 may also simply determine whether or not the parameter of the "REPORT POWER STATUS" received by the CEC unit 83 from the TV 11 is "ON".

In this case, the parameter is "ON" in the "REPORT POWER STATUS" transmitted as a result of the processing in step S14 in FIG. 7, and thus it is determined that the TV 11 is powered on. The process then proceeds to step S81.

In step S81, the counter 252 resets the count value that was being counted, and the process returns to step S71. In other words, since the TV 11 is powered on, it is again determined whether a polling message has been received.

As described above, the AV amp 12 is configured to conduct HDMI pass-through while the TV 11 is powered on, and thus power supply to the HDMI block 99 is not suspended during this time.

In contrast, if it is determined in step S11 (FIG. 7) that the power state is not "ON", then the process proceeds to step S15, and the controller 32 of the TV 11 determines whether or not the system-wide power state of the TV 11 is in standby. If it is determined in step S15 that the power state is in standby, then the process proceeds to step S16.

At this point, the controller 32 of the TV 11 does not cause the CEC unit 52 to transmit "POLLING MESSAGE", and thus it is determined in step S73 (FIG. 9) that a polling message has not been received. Furthermore, subsequent polling messages are not received from the TV 11, and thus it is determined in step S75 that the count value has reached 31, for example, and that 31 seconds have elapsed since initiating the count. For this reason, the process proceeds to step S76.

In step S76, the communication controller 253 reads the "GIVE DEVICE POWER STATUS" message from the message manager 254, and causes the CEC unit 83 to transmit the above message to the TV 11.

In step S77, the counter 252 starts a count once the CEC unit 83 transmits "GIVE DEVICE POWER STATUS" to the TV 11. In step S78, the counter 252 resets the count value, while also newly incrementing the count value by 1.

In step S16 (FIG. 7), the controller 32 of the TV 11 determines whether or not the CEC unit 52 has received the "GIVE DEVICE POWER STATUS" transmitted from the AV amp 12.

If it is determined in step S16 that "GIVE DEVICE POWER STATUS" has not been received, then the process skips step S17.

In contrast, if it is determined in step S16 that "GIVE DEVICE POWER STATUS" has been received, then the process proceeds to step S17.

In step S17, the controller 32 causes the CEC unit 52 to transmit the "REPORT POWER STATUS" CEC message.

At this point, the TV 11 is in standby, and so in step S17, the controller 32 causes the CEC unit 52 to transmit "REPORT POWER STATUS" with the parameter "STANDBY" to the AV amp 12.

At this point, in step S79 (FIG. 9), the communication controller 253 of the AV amp 12 determines whether or not the CEC unit 83 has received the "REPORT POWER STATUS" transmitted from the TV 11 as a result of the processing in step S17 (FIG. 7).

If it is determined in step S79 that "REPORT POWER STATUS" has been received from the TV 11, then the process proceeds to step S80.

In step S80, the communication controller 253 uses the parameter of the "REPORT POWER STATUS" received by the CEC unit 83 as a basis for determining whether or not the TV 11 is powered on. In this case, the parameter of the "REPORT POWER STATUS" transmitted as a result of the processing in step S14 in FIG. 7 is "STANDBY" rather than "ON", and so it is determined that the TV 11 is not powered on. The process then proceeds to step S83.

In contrast, if it is determined in step S79 that "REPORT POWER STATUS" has not been received from the TV 11, then the process proceeds to step S82.

In step S82, the counter 252 determines whether or not the count value being counted has reached a predetermined count value. For example, the counter 252 may increment the count by 1 every second, and the predetermined count value may be 3. In this case, the counter 252 determines whether or not the count value has reached 3, or in other words, whether or not a predetermined amount of time (3 seconds, in this case) has elapsed since initiating the count in step S77.

If, for example, it is determined in step S82 that the count value has not reached 3 (i.e., 3 seconds have not elapsed since initiating the count in step S77), then the process returns to step S78, the count value is incremented by 1, and then it is again determined whether or not "REPORT POWER STATUS" has been received. At this point, if it is determined that "REPORT POWER STATUS" has been received, then in step S80 the parameter of "REPORT POWER STATUS" is used as a basis for determining whether or not the TV 11 is powered on. Otherwise, the counter 252 increments the count value by 1 every second for as long as it continues to be determined that 3 seconds have not elapsed since initiating the count in step S77.

In contrast, if it is determined in step S82 that the count value has reached 3, for example, and that 3 seconds have elapsed since initiating the count in step S77, then the process proceeds to step S83. In other words, the process proceeds to step S83 when "REPORT POWER STATUS" is not received during the first three seconds after initiating the count.

In step S83, the power controller 251 suspends power supply from the power supply 74 to the HDMI block 99. In other words, the HDMI block 99 is powered off, and the process returns to step S33 in the flowchart shown in FIG. 8.

In step S34, the microcontroller 72 sets a power off flag indicating that HDMI block power has been switched off. The process for powering off the HDMI block 99 is then terminated.

In the process described above, a wait time is set, starting from transmission of "GIVE DEVICE POWER STATUS" and lasting until reception of "REPORT POWER STATUS". The wait time thus becomes a safeguard process for when the AV amp 12 is connected to a TV that is incompatible with HDMI-CEC, or when the TV is unable to respond to CEC messages due to the primary power supply being powered off. When the wait time has exceeded a predetermined amount of time, it is most desirable to power off the HDMI block 99 as described above, but the HDMI block 99 may also be left on.

As a result of the above process, power supply to the HDMI block 99 of the AV amp 12 can be controlled in accordance with the interval between the receipt of polling messages from the TV 11, and in accordance with the power state of the TV 11. More specifically, since HDMI pass-through can be neglected when the TV 11 is in standby, the AV amp 12 is able to suspend power supply to the HDMI block 99 during such times. As a result, it becomes possible to reduce standby power draw in the AV amp 12.

Additionally, CEC-compatible devices include a "ONE TOUCH PLAY" functions whereby other CEC-compatible devices in standby (such as the above TV 11) can be activated (i.e., powered on) by a single user operation.

More specifically, in step S91 (FIG. 10), the controller 103 of the BD recorder 14 determines whether or not instructions for the "ONE TOUCH PLAY" function have been issued as a result of the user operating a Play button or similar user-operable element, for example.

If it is determined in step S91 that instructions for the "ONE TOUCH PLAY" function have been issued, then the process proceeds to step S92. In step S92, the controller 103 causes the CEC unit 111 to transmit "ACTIVE SOURCE" to the TV 11 and the AV amp 12. "ACTIVE SOURCE" is a CEC message transmitted from the BD recorder 14 when instructions for the "ONE TOUCH PLAY" function are issued to the BD recorder 14.

In step S93, the controller 103 causes the CEC unit 111 to transmit "TEXT VIEW ON" to the TV 11. "TEXT VIEW ON" is a CEC message transmitted from the BD recorder 14 to the TV 11 when instructions for the "ONE TOUCH PLAY" function are issued to the BD recorder 14.

Herein, in step S18 (FIG. 7), the controller 32 of the TV 11 determines whether or not the CEC unit 52 has received an "ACTIVE SOURCE" or "TEXT VIEW ON" message transmitted from the BD recorder 14.

If it is determined in step S18 that neither an "ACTIVE SOURCE" nor a "TEXT VIEW ON" message has been received, then the process returns to step S11.

In contrast, if it is determined in step S18 that either an "ACTIVE SOURCE" nor a "TEXT VIEW ON" message has been received, then the process proceeds to step S19.

In step S19, the controller 32 powers on the TV 11, and then the process returns to step S11.

As described above, it is possible to power on the TV 11 in accordance with instructions for a "ONE TOUCH PLAY" function issued to the BD recorder 14.

Meanwhile, in step S111 (FIG. 11), the power controller 251 of the AV amp 12 uses the state of power supply from the power supply 74 to the various components of the AV amp 12 as a basis for determining whether or not the system-wide power state of the AV amp 12 is ACTIVE STANDBY (i.e., the standby state).

If it is determined in step S111 that the system-wide power state of the AV amp 12 is not ACTIVE STANDBY (i.e., that the power state of the AV amp 12 is POWER ON or OFF), then the processing in step S111 is repeated until the power state becomes ACTIVE STANDBY. During this time, the power lamp of the display 96 is lit green or extinguished.

In contrast, if it is determined in step S111 that the system-wide power state of the AV amp 12 is ACTIVE STANDBY, then the process proceeds to step S112, and the microcontroller 72 determines whether or not the power off flag has been set.

If it is determined in step S112 that the power off flag has not been set, then the process returns to step S111, and steps S111 and S112 are repeated.

In contrast, if it is determined in step S112 that the power off flag has been set, then the process proceeds to step S113.

In step S113 (FIG. 11), the communication controller 253 of the AV amp 12 determines whether or not the CEC unit 83 has received an "ACTIVE SOURCE" message transmitted from the BD recorder 14 or other CEC-compatible device.

If it is determined in step S113 that "ACTIVE SOURCE" has not been received, then the processing in steps S111 to S113 is repeated until "ACTIVE SOURCE" is received.

In contrast, if it is determined in step S113 that "ACTIVE SOURCE" has been received, then the process proceeds to step S114. In step S114, the power controller 251 initiates power supply from the power supply 74 to the HDMI block 99. In other words, the power controller 251 powers on the HDMI block 99.

In step S115, the microcontroller 72 clears the power off flag indicating that HDMI block power has been switched off. The process for powering on the HDMI block 99 is then terminated.

As described above, the AV amp 12 powers on the HDMI block 99 in accordance with instructions for a "ONE TOUCH PLAY" function issued to the BD recorder 14. For this reason, the HDMI block 99 is again able to conduct HDMI pass-through, in conjunction with the TV 11 being powered on.

Meanwhile, if it is determined in step S15 (FIG. 7) that the power state is "STANDBY" (i.e., that the power state is "OFF"), then the process repeats step S71. At this point, in the flowchart shown in FIG. 9, the AV amp 12 has not received a polling message (step S73) or "REPORT POWER STATUS" (step S79), and the HDMI block 99 is powered off.

In the foregoing, "TEXT VIEW ON" is transmitted in step S92. However, it should be appreciated that the CEC message "IMAGE VIEW ON", which has a nearly identical function, may also be transmitted at this point.

The foregoing processes are summarized by the process illustrated by the flowchart in FIG. 12.

In step S12, the TV 11 transmits "POLLING MESSAGE" to the AV amp 12 and the BD recorder 14, which are CEC-compatible device connected to the TV 11 via HDMI. The TV 11 periodically transmits polling messages (such as once every 15 seconds, for example).

In step S73, the AV amp 12 receives the polling messages transmitted from the TV 11, at 15 second intervals, for example.

At this point, BD recorder 14 also receives the polling messages transmitted from the TV 11, at 15 second intervals, for example.

In step S15, the TV 11 enters standby in response to a standby operation performed by the user. As a result, the TV 11 stops transmitting the polling messages that had been periodically sent to the AV amp 12 and the BD recorder 14.

In step S75, the AV amp 12 detects that n seconds have elapsed since the receipt of the last polling message. Herein, the amount of time n (in seconds) may be, for example, two times the 15 second polling message transmit interval, with an additional 1 second margin for a total of 31 seconds. However, the amount of time n may be suitably modified in accordance with the polling message transmit interval.

At this point, when the TV 11 enters standby, the AV amp 12 may, for example, detect that a "STANDBY" message (not shown in the drawings) transmitted from the TV 11 has been received. "STANDBY" is a CEC message transmitted from the TV 11 when the user has performed an operation to put the TV 11 into standby. By receiving this "STANDBY" message, the AV amp 12 transitions to ACTIVE STANDBY, and controls the HDMI block 99 power as described earlier.

In step S76, the AV amp 12 transmits "GIVE DEVICE POWER STATUS" to the TV 11.

In step S16, the TV 11 receives the "GIVE DEVICE POWER STATUS" transmitted from the AV amp 12.

At this point, the TV 11 is in standby, and thus in step S17 the TV 11 transmits to the AV amp 12 a "REPORT POWER STATUS" with the parameter "STANDBY", which indicates that the TV 11 is in standby.

In steps S79 and S80, the AV amp 12 receives the "REPORT POWER STATUS" (with the parameter "STANDBY") transmitted from the TV 11.

The parameter of the received "REPORT POWER STATUS" indicates that the TV 11 is not powered on, and thus in step S83 the AV amp 12 powers off the HDMI block 99.

According to the above process, when the system-wide power state of the AV amp 12 (i.e., the HDMI repeater) is in standby (ACTIVE STANDBY), and additionally, when it is possible to control the operation of the HDMI block 99 (CONTROL FOR HDMI=ON), the AV amp 12 (i.e., the HDMI repeater) is able to power off the HDMI block 99 that conducts HDMI pass-through in accordance with information such as the interval between the receipt of polling messages from the TV 11, and the power state of the TV 11. At this point, since the TV 11 is not powered on and HDMI pass-through can be neglected, the AV amp 12 stops power supply to the HDMI block 99. For this reason, it becomes possible to reduce standby power draw.

In the foregoing, the TV 11 is described as periodically transmitting polling messages. However, if the design specifications are such that the TV 11 does not periodically transmit polling messages, the AV amp 12 may ascertain the power state of the TV 11 by transmitting "GIVE DEVICE POWER STATUS" and receiving "REPORT POWER STATUS".

Furthermore, in special circumstances, such as when the primary power supply of the TV 11 is powered off, the TV 11 might not transmit "REPORT POWER STATUS" in step S15 of FIG. 12 in response to "GIVE DEVICE POWER STATUS" from the AV amp 12. In other words, the AV amp 12 might not receive "REPORT POWER STATUS", and thus will power off the HDMI block 99 after a predetermined amount of time has elapsed since transmitting "GIVE DEVICE POWER STATUS". The AV amp 12 may operate similarly in cases such as when the TV 11 is incompatible with CEC, or when CEC-related function settings are disabled in the TV 11.

In step S91, the BD recorder 14 issues instructions for the "ONE TOUCH PLAY" function, as a result of the user operating a Play button or similar user-operable element, for example.

In step S92, the BD recorder 14 transmits "ACTIVE SOURCE" to the TV 11 and the AV amp 12, and in step S93, the BD recorder 14 transmits "TEXT VIEW ON" to the TV 11.

In step S18, the TV 11 receives the "ACTIVE SOURCE" and the "TEXT VIEW ON" from the BD recorder 14.

In step S19, on the basis of the received "ACTIVE SOURCE" or "TEXT VIEW ON", the TV 11 powers on from standby.

Meanwhile, in step S113, the AV amp 12 receives the "ACTIVE SOURCE" from the BD recorder 14.

In step S114, on the basis of the received "ACTIVE SOURCE", the AV amp 12 powers on the HDMI block 99.

According to the above process, when the system-wide power state of the AV amp 12 is ACTIVE STANDBY, and additionally, when it is possible to control the operation of the HDMI block 99 (CONTROL FOR HDMI=ON), the AV amp 12 (i.e., the HDMI repeater) is able to power on the HDMI block 99 in accordance with instructions for a "ONE TOUCH PLAY" function issued to the BD recorder 14 (i.e., the HDMI source), even if the HDMI block 99 is currently powered off. At this point, the TV 11 is also powered on, and thus the AV amp 12 is able to transition from a state of reduced standby power draw back to a state wherein HDMI pass-through can be conducted.

In the foregoing, the AV amp 12 is described as powering on the HDMI block 99 on the basis of the "ACTIVE SOURCE" from the BD recorder 14. However, the AV amp 12 may also power on the HDMI block 99 on the basis of other CEC messages. For example, the AV amp 12 may be configured to power on the HDMI block 99 on the basis of the "POLLING MESSAGE" from the TV 11, or the receipt of "ROUTING CHANGE" and "ROUTING INFORMATION" messages transmitted together by HDMI input upon activation of the TV 11. In so doing, the AV amp 12 is able to power on the HDMI block 99 on the basis of CEC messages from the TV 11, even when, for example, the BD recorder 14 is not a CEC-compatible device.

Herein, "ROUTING CHANGE" is a CEC message transmitted to all HDMI apparatus connected by HDMI upon activation of the TV 11 or similar times when the active HDMI connections with other HDMI apparatus have changed. "ROUTING INFORMATION" is a CEC message transmitted to all HDMI apparatus connected by HDMI upon activation of the TV 11, for example.

Additionally, the AV amp 12 may be configured to control the power state of the HDMI block 99 on the basis of still other received CEC messages. The HDMI-CEC standard allows for messages unique to a manufacturer (referred to as vendor-specific commands) to be defined and implemented. The AV amp 12 may thus be configured to separately use vendor-specific commands in addition to universal messages defined in the HDMI-CEC standard like those described above.

In the foregoing example, when initiating power supply to the HDMI block 99, an "ACTIVE SOURCE" is received without any particular regard for the message origin. However, power supply to the HDMI block 99 may also be conducted after first using physical addresses contained in the message to determined whether or not the HDMI signal should pass through the AV amp 12. In other words, power supply to the HDMI block 99 may be initiated after determining whether or not the message origin exists on the branch of the AV amp 12.

As a more specific example, consider the case wherein the respective physical addresses of the TV 11, AV amp 12, BD recorder 14, DVD player 15, and satellite tuner 16 are (0.0.0.0), (1.0.0.0), (1.1.0.0), (1.2.0.0), (1.3.0.0), as shown in FIG. 1. In this case, if the recipients of an "ACTIVE SOURCE" message are limited to (0.0.0.0) and (1.*.*.*) (where is an arbitrary value), then the HDMI block 99 will no longer be temporarily supplied with power when another CEC-compatible device (not shown in the drawings) unrelated to the HDMI branch of the AV amp 12 is operated. Consequently, operation at a lower power than that of the foregoing example can be achieved.

It should also be appreciated that while pre- and post-change physical addresses are included as the parameters of other messages such as "ROUTING CHANGE", such post-change addresses can be specified as described above to limit the recipients of the "ROUTING CHANGE" message. The recipients of the "ROUTING INFORMATION" message can also be limited similarly to that of "ACTIVE SOURCE".

According to the above configuration, HDMI pass-through while the AV amp 12 is in ACTIVE STANDBY can be coupled to the power state of the TV 11. Consequently, it becomes possible for the HDMI pass-through of the AV amp 12 to be initiated even when an HDMI source (not shown in the drawings) incompatible with the HDMI-CEC standard is connected to the AV amp 12. The HDMI pass-through of the AV amp 12 is initiated by means of a message transmitted when the TV 11 is powered on, with HDMI pass-through being initiated upon receipt of that message. In so doing, standby power draw can be suppressed.

The foregoing describes controlling power supply to the HDMI block in an HDMI repeater. However, it should be appreciated that the foregoing is not limited to HDMI repeaters, and that HDMI block power supply can be similarly controlled in other CEC-compatible devices that include HDMI blocks, such as HDMI sinks and HDMI sources.

The series of processes executed by the AV amp 12 and described above may be executed by means of hardware or software. In the case of execution by means of software, a program constituting such software may be installed from a program recording medium on a computer built into special-purpose hardware. Alternatively, the program may be installed on a general-purpose personal computer or similar apparatus capable of executing various functions by installing various programs thereon.

FIG. 13 is a block diagram illustrating an exemplary hardware configuration of a computer that executes the above series of processes by means of a program.

In the computer, a CPU (Central Processing Unit) 901, ROM (Read-Only Memory) 902, and RAM (Random Access Memory) 903 corresponding to the microcontroller 72 are connected by a bus 904.

Also connected to the bus 904 is an input/output interface 905. Connected to the input/output interface 905 are: an input unit 906 made up of devices such as a keyboard, mouse, and microphone; an output unit 907 made up of devices such as a display and one or more speakers; a storage unit 908 made up of components such as a hard disk and non-volatile memory; a communication unit 909 made up of components such as a network interface; and a drive 910 that drives a removable medium 911, such as a magnetic disk, an optical disc, a magneto-optical disc, or semiconductor memory.

In the computer configured as described above, the CPU 901 conducts the foregoing series of processes by, for example, loading a program stored in the storage unit 908 into the RAM 903 via the input/output interface 905 and the bus 904, and then executing the program.

The program executed by the computer (i.e., the CPU 901) may be recorded onto the removable medium 911. The removable medium 911 may be one instance of packaged media realized by magnetic disks (including flexible disks), optical discs (including CD-ROMs (Compact Disc Read-Only Memory) and DVDs (Digital Versatile Disc)), magneto-optical discs, or semiconductor memory. Alternatively, the program may be provided via a wired or wireless transmission medium, such as a local area network, the Internet, or a digital satellite broadcast.

Additionally, by loading the removable medium 911 into the drive 910, the program may be installed onto the storage unit 908 via the input/output interface 905. The program may also be received by the communication unit 909 via a wired or wireless transmission medium, and installed onto the storage unit 908. In addition to the above, the program may also be installed in advance in the ROM 902 or the storage unit 908.

It should also be appreciated that the program executed by the computer may execute processes in a time series following the sequence described in the present specification, in parallel, or at suitable timings, such as when called.

Furthermore, embodiments of the present invention are not limited to the foregoing, and various modifications are possible without departing from the scope and spirit of the present invention.

The present application contains subject matter related to that disclosed in Japanese Priority Patent Application JP 2008-299539 filed in the Japan Patent Office on Nov. 25, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus connected to a plurality of apparatus via an interface, wherein the plurality of apparatus includes a first apparatus and a second apparatus, the interface having a signal channel on which baseband signals are transmitted and a control channel on which control signals used for control are bidirectionally transmitted, the information processing apparatus comprising:
 a baseband signal manager configured to transmit a baseband signal sent from the first apparatus to the second apparatus as-is when the information processing apparatus is in a standby power state;
 determining means configured to determine a power state of the second apparatus on the basis of a control signal sent from the second apparatus; and
 power supply controlling means configured such that, when determining means determines that the second apparatus is not powered on based on the control signal, suspends power supply to the baseband signal manager.

2. The information processing apparatus according to claim 1, wherein the determining means
 transmits a control signal to the second apparatus requesting the power state of the second apparatus, and
 determines the power state of the second apparatus on the basis of a responding control signal sent from the second apparatus.

3. The information processing apparatus according to claim 2, wherein the determining means
 transmits the control signal to the second apparatus requesting the power state of the second apparatus, and
 determines that the second apparatus is not powered on when the responding control signal from the second apparatus is not received within a predetermined amount of time.

4. The information processing apparatus according to claim 2, wherein the determining means
 transmits the control signal to the second apparatus requesting the power state of the second apparatus,
 determines that the second apparatus is powered on when a responding control signal indicating that the second apparatus is powered on is received within a predetermined amount of time, and
 determines that the second apparatus is not powered on when the responding control signal indicating that the second apparatus is not powered on is received within a predetermined amount of time.

5. The information processing apparatus according to claim 1, wherein the determining means
 determines that the second apparatus is powered on for as long as polling messages from the second apparatus are being periodically received within a predetermined amount of time, and
 determines that the second apparatus is not powered on when the interval between the receipt of polling messages from the second apparatus has exceeded a predetermined amount of time.

6. The information processing apparatus according to claim 1, wherein
the determining means receives a predetermined control signal sent from the first apparatus, and
when power supply to the baseband signal manager has been suspended and when the determining means receives a responding control signal from the first apparatus for powering on apparatus connected via the interface the power supply controlling means initiates power supply to the baseband signal manager.

7. The information processing apparatus according to claim 1, wherein
the determining means receives a predetermined control signal sent from the second apparatus, and
when power supply to the baseband signal manager has been suspended and when the determining means receives a responding control signal from the second apparatus for powering on apparatus connected via the interface the power supply controller means initiates power supply to the baseband signal manager.

8. The information processing apparatus according to claim 1, wherein
the determining means receives a predetermined control signal from an apparatus other than the first or second apparatus, and
when power supply to the baseband signal manager has been suspended and when the determining means receives a responding control signal from an apparatus other than the first or second apparatus for powering on apparatus connected via the interface the power supply controlling means initiates power supply to the baseband signal manager.

9. The information processing apparatus according to claim 1, wherein
the interface is HDMI (High Definition Multimedia Interface), and
the control signals are CEC (Consumer Electronics Control) messages.

10. An information processing method for an information processing apparatus, wherein the information processing apparatus is connected to one or more apparatus via an interface, wherein the plurality of apparatus includes a first apparatus and a second apparatus, the interface having a signal channel on which baseband signals are transmitted, as well as a control channel on which control signals used for control are bidirectionally transmitted, and the information processing apparatus is provided with a baseband signal manager configured to transmit a baseband signal sent from the first apparatus to the second apparatus as-is when the information processing apparatus is in a standby power state, the method comprising:
determining a power state of the second apparatus on the basis of a control signal sent from the second apparatus; and
when it is determined that the second apparatus is not powered on based on the control signal, suspending power supply to the baseband signal manager.

11. A non-transitory computer-readable medium encoded with a plurality of instructions that, when executed by a computer, cause the computer to execute processing for controlling an information processing apparatus, wherein the information processing apparatus is connected to a plurality of apparatus via an interface, wherein the plurality of apparatus includes a first apparatus and a second apparatus, the interface having a signal channel on which baseband signals are transmitted and a control channel on which control signals used for control are bidirectionally transmitted, and the information processing apparatus is provided with a baseband signal manager configured to transmit a baseband signal sent from the first apparatus to the second apparatus as-is when the information processing apparatus is in a standby power state, the processing comprising:
determining a power state of the second apparatus on the basis of a control signal sent from the second apparatus; and
when it is determined that the second apparatus is not powered on based on the control signal, suspending power supply to the baseband signal manager.

12. An information processing apparatus connected to a plurality of apparatus via an interface, wherein the plurality of apparatus includes a first apparatus and a second apparatus, the interface having a signal channel on which baseband signals are transmitted, as well as a control channel on which control signals used for control are bidirectionally transmitted, and the information processing apparatus comprising:
a baseband signal manager configured to transmit a baseband signal sent from the first apparatus to the second apparatus as-is when the information processing apparatus is in a standby power state;
a determining unit configured to determine a power state of the second apparatus on the basis of a control signal sent from the second apparatus; and
a power supply controller configured such that, when the determining unit determines that the second apparatus is not powered on based on the control signal, suspends power supply to the baseband signal manager.

* * * * *